United States Patent
Kim et al.

(10) Patent No.: US 11,115,136 B1
(45) Date of Patent: Sep. 7, 2021

(54) METHOD FOR CALIBRATING AN ARRAY ANTENNA IN A WIRELESS COMMUNICATION SYSTEM AND APPARATUS THEREOF

(71) Applicants: LG ELECTRONICS INC., Seoul (KR); KOREA ADVANCED INSTITUTE OF SCIENCE AND TECHNOLOGY, Daejeon (KR)

(72) Inventors: Seongjae Kim, Daejeon (KR); Jaehoon Chung, Seoul (KR); Sangrim Lee, Seoul (KR); Dongho Cho, Seoul (KR); Juyong Lee, Daejeon (KR); Seungwon Keum, Daejeon (KR); Dangoh Kim, Sejong (KR); Sangmi Noh, Daejeon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/926,539

(22) Filed: Jul. 10, 2020

(51) Int. Cl.
*H04B 17/12* (2015.01)
*H04B 17/13* (2015.01)
*H04B 7/0452* (2017.01)
*H01Q 21/06* (2006.01)
*H01Q 3/26* (2006.01)

(52) U.S. Cl.
CPC ............ *H04B 17/12* (2015.01); *H01Q 3/267* (2013.01); *H01Q 21/065* (2013.01); *H04B 7/0452* (2013.01); *H04B 17/13* (2015.01)

(58) Field of Classification Search
CPC ...................................................... H04B 17/12
See application file for complete search history.

(56) References Cited

U.S. PATENT DOCUMENTS

| | | | |
|---|---|---|---|
| 6,693,588 B1* | 2/2004 | Schlee | H01Q 3/267 342/165 |
| 2008/0129613 A1* | 6/2008 | Ermutlu | H01Q 3/267 343/703 |
| 2010/0253572 A1* | 10/2010 | Hardacker | H01Q 3/267 342/174 |
| 2017/0358845 A1* | 12/2017 | Yen | H01Q 5/40 |
| 2019/0158194 A1* | 5/2019 | Wang | H04B 17/21 |

* cited by examiner

*Primary Examiner* — Hsinchun Liao
(74) *Attorney, Agent, or Firm* — Lee, Hong, Degerman, Kang & Waimey

(57) ABSTRACT

A method of calibrating an array antenna in a wireless communication system includes a first step of transmitting a radio signal through a first antenna and a second antenna determined among a plurality of antennas included in the array antenna, a second step of measuring the radio signal through a specific coupling antenna of a plurality of coupling antennas adjacent to the plurality of antennas, a third step of estimating an error of the second antenna based on a result of the measurement of the radio signal, and a fourth step of calibrating the second antenna based on the error.

20 Claims, 33 Drawing Sheets

METHOD FOR CALIBRATING AN ARRAY ANTENNA IN A WIRELESS COMMUNICATION SYSTEM AND APPARATUS THEREOF

BACKGROUND OF THE INVENTION

Field of the Invention

The present disclosure relates to a method and apparatus for calibrating an antenna array in a wireless communication system.

Related Art

A mobile communication system was developed to provide a voice service while ensuring the activity of a user. However, the area of the mobile communication system has extended up to data services in addition to voice. Due to a current explosive increase in traffic, there is a shortage of resources. Accordingly, there is a need for a more advanced mobile communication system because users demand higher speed services.

Requirements for a next-generation mobile communication system need to able to support the accommodation of explosive data traffic, a dramatic increase in the data rate per user, the accommodation of a significant increase in the number of connected devices, very low end-to-end latency, and high-energy efficiency. To this end, various technologies, such as dual connectivity, massive multiple input multiple output (MIMO), in-band full duplex, non-orthogonal multiple access (NOMA), the support of a super wideband, and device networking, are researched.

SUMMARY OF THE INVENTION

The present disclosure proposes a method of calibrating an array antenna.

In a conventional technology, the phase and gain error of an array antenna were estimated through a down-conversion mixer. However, the down-conversion mixer has a high cost and a high design level of difficulty.

There was proposed a technology for estimating phase and gain errors based on a channel environment estimated in a reception stage. However, the corresponding technology has a problem in that the accuracy of channel estimation may be degraded and has a critical point I that an effect of calibration is very small in terms of the phase calibration of an antenna if the volume of an array antenna is large because phase calibration is performed based on one phase shifter.

Accordingly, the present disclosure proposes a method and apparatus for calibrating an array antenna, which can solve the aforementioned problems of the conventional technology.

Technical problems to be solved by the present disclosure are not limited by the above-mentioned technical problems, and other technical problems which are not mentioned above can be clearly understood from the following description by those skilled in the art to which the present disclosure pertains.

In an embodiment, a method of calibrating an array antenna in a wireless communication system includes a first step of transmitting a radio signal through a first antenna and a second antenna determined among a plurality of antennas included in the array antenna, a second step of measuring the radio signal through a specific coupling antenna of a plurality of coupling antennas adjacent to the plurality of antennas, a third step of estimating an error of the second antenna based on a result of the measurement of the radio signal, and a fourth step of calibrating the second antenna based on the error.

The first step to the fourth step are repeatedly performed until the calibration of the plurality of antennas is completed. The first antenna is a reference antenna or the second antenna on which the calibration has already been performed. The second antenna is an antenna which is adjacent to the first antenna and on which the calibration has not been performed.

The radio signal may be transmitted based on a pre-configured adjustment value, and the result of the measurement may be based on an output of a power detector coupled to the specific coupling antenna.

The radio signal may be repeatedly transmitted by a specific number of times.

The pre-configured adjustment value may be changed whenever the radio signal is transmitted.

The pre-configured adjustment value may be related to at least one of a phase of the radio signal or a gain of the radio signal.

The pre-configured adjustment value may include a first adjustment value related to the first antenna and a second adjustment value related to the second antenna.

The first antenna and the second antenna may be determined among antennas related to a first location in the array antenna, and the first location may be based on a row or column of the array antenna.

Based on the completion of the calibration of the antennas related to the first location, the first antenna may be determined as any one of the antennas related to the first location, and the second antenna may be determined among antennas related to a second location.

The second location may be based on a row or column adjacent to the first location.

The plurality of coupling antennas may be disposed in one row or one column parallel to a specific row or specific column of the array antenna, respectively, and the specific coupling antenna may be one of coupling antennas belonging to a row or column parallel to the first location.

In another embodiment, an apparatus for calibrating an array antenna in a wireless communication system includes an array antenna, one or more transceivers configured to transmit or receive a radio signal through the array antenna, a plurality of coupling antennas configured to measure the radio signal, a plurality of power detectors coupled to the plurality of coupling antennas, one or more processors configured to control the apparatus, and one or more memories operatively coupled to the one or more processors and configured to store instructions for performing operations when a calibration of the array antenna is executed by the one or more processors.

The operations include a first step of transmitting a radio signal through a first antenna and a second antenna determined among a plurality of antennas included in the array antenna, a second step of measuring the radio signal through a specific coupling antenna of a plurality of coupling antennas adjacent to the plurality of antennas, a third step of estimating an error of the second antenna based on a result of the measurement of the radio signal, and a fourth step of calibrating the second antenna based on the error.

The first step to the fourth step are repeatedly performed until a calibration of the plurality of antennas is completed, the first antenna is a reference antenna or the second antenna on which the calibration has already been performed, and the second antenna is an antenna which is adjacent to the first antenna and on which the calibration has not been performed.

The radio signal may be transmitted based on a pre-configured adjustment value, and the result of the measurement may be based on an output of a power detector coupled to the specific coupling antenna.

The radio signal may be repeatedly transmitted by a specific number of times.

The pre-configured adjustment value may be changed whenever the radio signal is transmitted.

The pre-configured adjustment value may be related to at least one of a phase of the radio signal or a gain of the radio signal.

The pre-configured adjustment value may include a first adjustment value related to the first antenna and a second adjustment value related to the second antenna.

The first antenna and the second antenna may be determined among antennas related to a first location in the array antenna, and the first location may be based on a row or column of the array antenna.

Based on the completion of the calibration of the antennas related to the first location, the first antenna may be determined as any one of the antennas related to the first location, and the second antenna may be determined among antennas related to a second location.

The plurality of coupling antennas may be disposed in one row or one column parallel to a specific row or specific column of the array antenna, respectively, and the specific coupling antenna may be one of coupling antennas belonging to a row or column parallel to the first location.

One or more non-transitory computer-readable media according to still another embodiment of the present disclosure store one or more commands.

One or more instructions executable by one or more processors are configured to enable an apparatus to perform a first step of transmitting a radio signal through a first antenna and a second antenna determined among a plurality of antennas included in the array antenna, a second step of measuring the radio signal through a specific coupling antenna of a plurality of coupling antennas adjacent to the plurality of antennas, a third step of estimating an error of the second antenna based on a result of the measurement of the radio signal, and a fourth step of calibrating the second antenna based on the error.

The first step to the fourth step are repeatedly performed until a calibration of the plurality of antennas is completed, the first antenna is a reference antenna or the second antenna on which the calibration has already been performed, and the second antenna is an antenna which is adjacent to the first antenna and on which the calibration has not been performed.

BRIEF DESCRIPTION OF THE DRAWINGS

The accompanying drawings, which are included to provide a further understanding of the invention and are incorporated in and constitute a part of this specification, exemplarily represent embodiments of the invention and together with the description serve to explain the principles of the invention. In the drawings.

DESCRIPTION OF EXEMPLARY EMBODIMENTS

Figure 1:
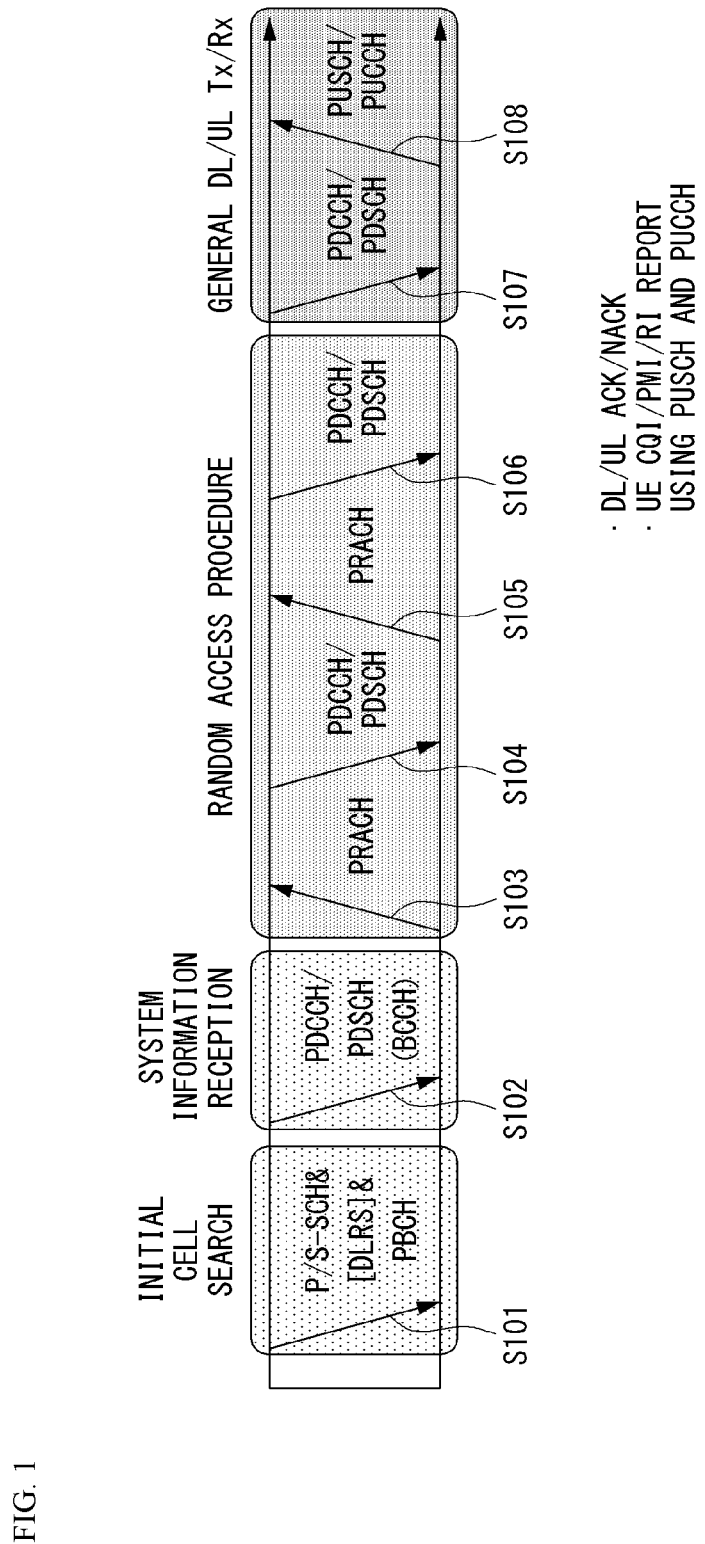
FIG. 1 illustrates physical channels and general signal transmission used in a 3GPP system.

Hereinafter, embodiments disclosed in the present specification will be described in detail with reference to the accompanying drawings, but the same or similar components are denoted by the same and similar reference numerals, and redundant descriptions thereof will be omitted. The suffixes "module" and "unit" for components used in the following description are given or used interchangeably in consideration of only the ease of preparation of the specification, and do not have meanings or roles that are distinguished from each other by themselves. In addition, in describing the embodiments disclosed in the present specification, when it is determined that a detailed description of related known technologies may obscure the subject matter of the embodiments disclosed in the present specification, the detailed description thereof will be omitted. In addition, the accompanying drawings are for easy understanding of the embodiments disclosed in the present specification, and the technical idea disclosed in the present specification is not limited by the accompanying drawings, and all modifications included in the spirit and scope of the present invention, It should be understood to include equivalents or substitutes.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), an access point (AP), or generation NB (general NB, gNB). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000. TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

For clarity, the description is based on a 3GPP communication system (eg, LTE, NR, etc.), but the technical idea of the present invention is not limited thereto. LTE refers to the technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to the technology after TS 38.xxx Release 15. 3GPP 6G may mean technology after TS Release 17 and/or Release 18. "xxx" means standard document detail number. LTE/NR/6G may be collectively referred to as a 3GPP system. Background art, terms, abbreviations, and the like used in the description of the present invention may refer to matters described in standard documents published before the present invention. For example, you can refer to the following document:

3GPP LTE
36.211: Physical channels and modulation
36.212: Multiplexing and channel coding
36.213: Physical layer procedures
36.300: Overall description
36.331: Radio Resource Control (RRC)
3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification
Physical Channel and Frame Structure
Physical Channels and General Signal Transmission
FIG. 1 illustrates physical channels and general signal transmission used in a 3GPP system. In a wireless communication system, a terminal receives information from a base station through a downlink (DL), and the terminal transmits information to the base station through an uplink (UL). The information transmitted and received by the base station and the terminal includes data and various control information, and various physical channels exist according to the type/use of information transmitted and received by them.

When the terminal is powered on or newly enters a cell, the terminal performs an initial cell search operation such as synchronizing with the base station (S101). To this end, the UE receives a Primary Synchronization Signal (PSS) and a Secondary Synchronization Signal (SSS) from the base station to synchronize with the base station and obtain information such as cell ID. Thereafter, the terminal may receive a physical broadcast channel (PBCH) from the base station to obtain intra-cell broadcast information. Meanwhile, the UE may receive a downlink reference signal (DL RS) in the initial cell search step to check a downlink channel state.

After completing the initial cell search, the UE receives a physical downlink control channel (PDCCH) and a physical downlink shared channel (PDSCH) according to the information carried on the PDCCH, thereby receiving a more specific system Information can be obtained (S102).

On the other hand, when accessing the base station for the first time or when there is no radio resource for signal transmission, the terminal may perform a random access procedure (RACH) for the base station (S103 to S106). To this end, the UE transmits a specific sequence as a preamble through a physical random access channel (PRACH) (S103 and S105), and a response message to the preamble through a PDCCH and a corresponding PDSCH (RAR (Random Access Response) message) In the case of contention-based RACH, a contention resolution procedure may be additionally performed (S106).

After performing the above-described procedure, the UE receives PDCCH/PDSCH (S107) and physical uplink shared channel (PUSCH)/physical uplink control channel as a general uplink/downlink signal transmission procedure. (Physical Uplink Control Channel; PUCCH) transmission (S108) can be performed. In particular, the terminal may receive downlink control information (DCI) through the PDCCH. Here, the DCI includes control information such as resource allocation information for the terminal, and different formats may be applied according to the purpose of use.

On the other hand, control information transmitted by the terminal to the base station through uplink or received by the terminal from the base station is a downlink/uplink ACK/NACK signal, a channel quality indicator (CQI), a precoding matrix index (PMI), and (Rank Indicator) may be included. The terminal may transmit control information such as CQI/PMI/RI described above through PUSCH and/or PUCCH.

Structure of Uplink and Downlink Channels

Downlink Channel Structure

The base station transmits a related signal to the terminal through a downlink channel to be described later, and the terminal receives a related signal from the base station through a downlink channel to be described later.

(1) Physical Downlink Shared Channel (PDSCH)

PDSCH carries downlink data (eg, DL-shared channel transport block, DL-SCH TB), and includes Quadrature Phase Shift Keying (QPSK), Quadrature Amplitude Modulation (QAM), 64 QAM, 256 QAM, etc. The modulation method is applied. A codeword is generated by encoding TB. The PDSCH can carry multiple codewords. Scrambling and modulation mapping are performed for each codeword, and modulation symbols generated from each codeword are mapped to one or more layers (Layer mapping). Each layer is mapped to a resource together with a demodulation reference signal (DMRS) to generate an OFDM symbol signal, and is transmitted through a corresponding antenna port.

(2) Physical Downlink Control Channel (PDCCH)

The PDCCH carries downlink control information (DCI) and a QPSK modulation method is applied. One PDCCH is composed of 1, 2, 4, 8, 16 Control Channel Elements (CCEs) according to the Aggregation Level (AL). One CCE consists of 6 REGs (Resource Element Group). One REG is defined by one OFDM symbol and one (P)RB.

The UE acquires DCI transmitted through the PDCCH by performing decoding (aka, blind decoding) on the set of PDCCH candidates. The set of PDCCH candidates decoded by the UE is defined as a PDCCH search space set. The search space set may be a common search space or a UE-specific search space. The UE may acquire DCI by monitoring PDCCH candidates in one or more search space sets set by MIB or higher layer signaling.

Uplink Channel Structure

The terminal transmits a related signal to the base station through an uplink channel to be described later, and the base station receives a related signal from the terminal through an uplink channel to be described later.

(1) Physical uplink shared channel (PUSCH)

PUSCH carries uplink data (eg, UL-shared channel transport block, UL-SCH TB) and/or uplink control information (UCI), and CP-OFDM (Cyclic Prefix-Orthogonal Frequency Division Multiplexing) waveform (waveform), DFT-s-OFDM (Discrete Fourier Transform-spread-Orthogonal Frequency Division Multiplexing) is transmitted based on the waveform. When the PUSCH is transmitted based on the DFT-s-OFDM waveform, the UE transmits the PUSCH by applying transform precoding. For example, when transform precoding is not possible (eg, transform precoding is disabled), the UE transmits a PUSCH based on the CP-OFDM waveform, and when transform precoding is possible (eg, transform precoding is enabled), the UE is CP-OFDM. PUSCH may be transmitted based on a waveform or a DFT-s-OFDM waveform. PUSCH transmission is dynamically scheduled by the UL grant in the DCI or is semi-static based on higher layer (e.g., RRC) signaling (and/or Layer 1 (L1) signaling (e.g., PDCCH)). Can be scheduled (configured grant). PUSCH transmission may be performed based on a codebook or a non-codebook.

(2) Physical Uplink Control Channel (PUCCH)

The PUCCH carries uplink control information, HARQ-ACK, and/or scheduling request (SR), and may be divided into a plurality of PUCCHs according to the PUCCH transmission length.

6G System General

A 6G (wireless communication) system has purposes such as (i) very high data rate per device, (ii) a very large number of connected devices, (iii) global connectivity, (iv) very low latency, (v) decrease in energy consumption of battery-free IoT devices, (vi) ultra-reliable connectivity, and (vii) connected intelligence with machine learning capacity. The vision of the 6G system may include four aspects such as "intelligent connectivity", "deep connectivity", "holographic connectivity" and "ubiquitous connectivity", and the 6G system may satisfy the requirements shown in Table 1 below. That is, Table 1 shows the requirements of the 6G system.

TABLE 1

| | |
|---|---|
| Per device peak data rate | 1 Tbps |
| E2E latency | 1 ms |
| Maximum spectral efficiency | 100 bps/Hz |
| Mobility support | Up to 1000 km/hr |
| Satellite integration | Fully |
| AI | Fully |
| Autonomous vehicle | Fully |
| XR | Fully |
| Haptic Communication | Fully |

At this time, the 6G system may have key factors such as enhanced mobile broadband (eMBB), ultra-reliable low latency communications (URLLC), massive machine type communications (mMTC), AI integrated communication, tactile Internet, high throughput, high network capacity, high energy efficiency, low backhaul and access network congestion and enhanced data security.

Figure 2:
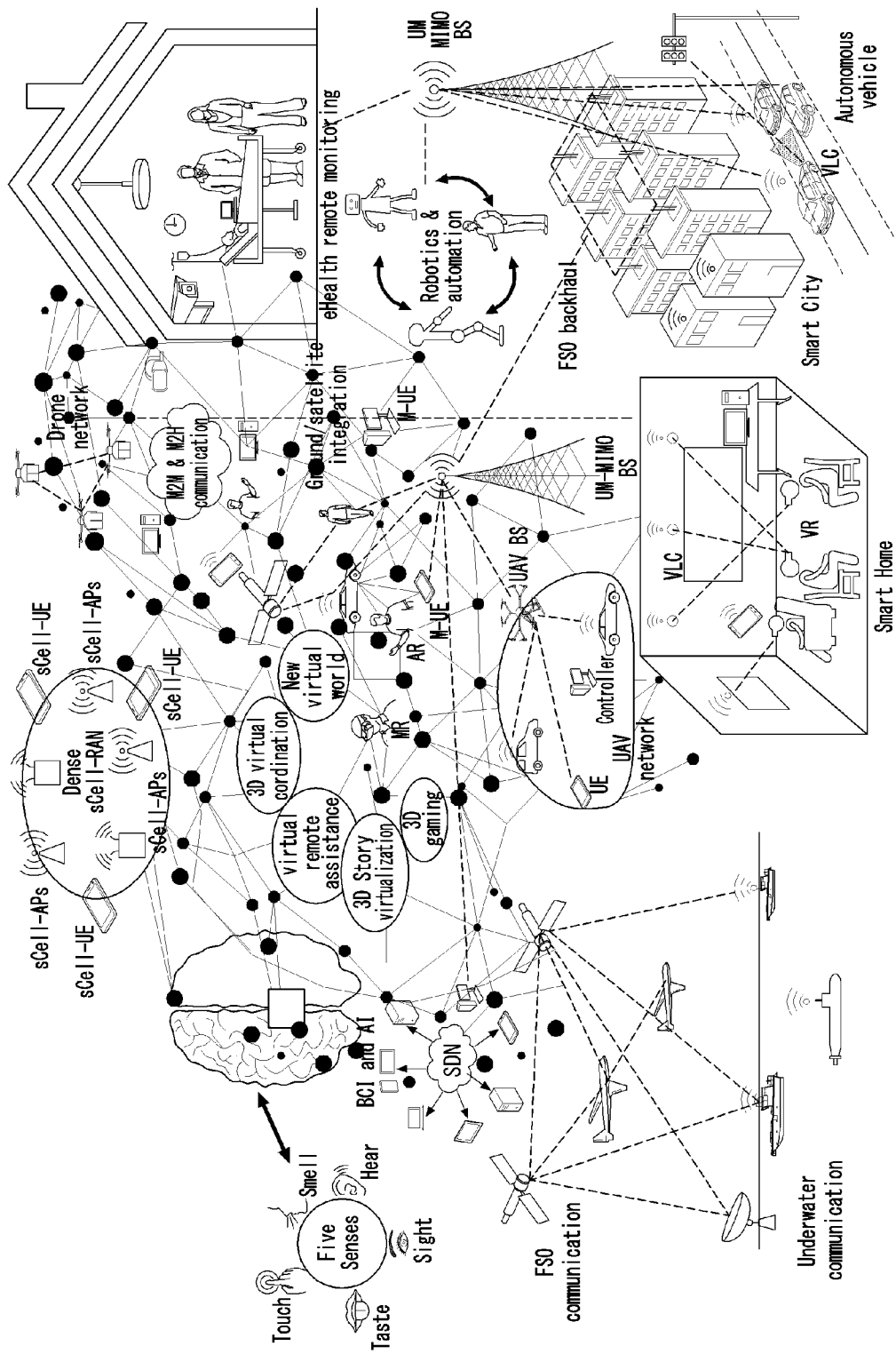
FIG. 2 is a view showing an example of a communication structure providable in a 6G system applicable to the present disclosure.

FIG. 2 is a view showing an example of a communication structure providable in a 6G system applicable to the present disclosure.

Figure 15:
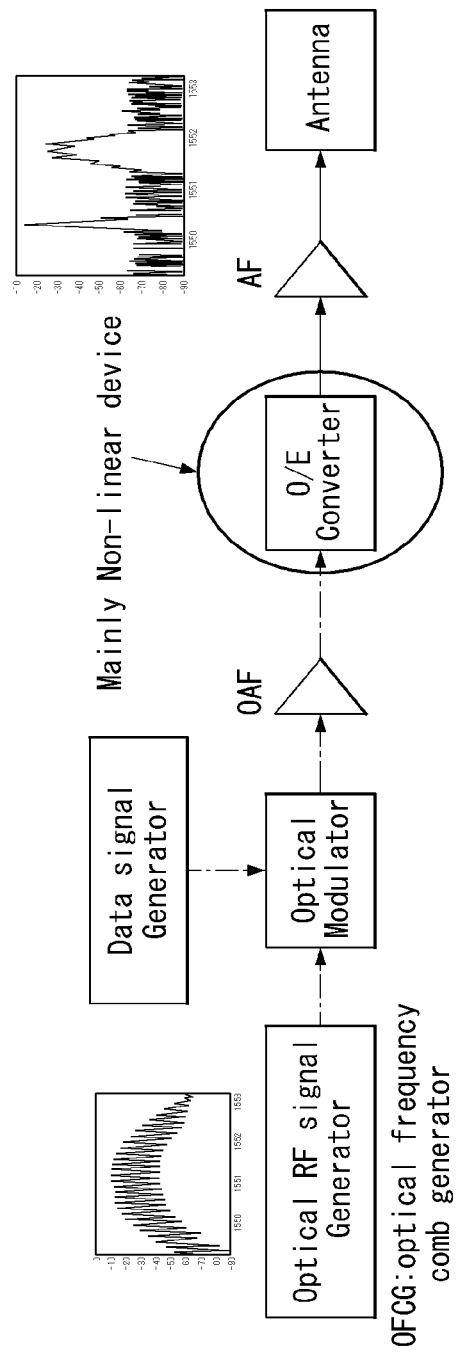
FIG. 15 is a view showing a transmitter structure applicable to the present disclosure.

Referring to FIG. 15, the 6G system will have 50 times higher simultaneous wireless communication connectivity than a 5G wireless communication system. URLLC, which is the key feature of 5G, will become more important technology by providing end-to-end latency less than 1 ms in 6G communication. At this time, the 6G system may have much better volumetric spectrum efficiency unlike frequently used domain spectrum efficiency. The 6G system may provide advanced battery technology for energy harvesting and very long battery life and thus mobile devices may not need to be separately charged in the 6G system. In addition, in 6G, new network characteristics may be as follows.

Satellites integrated network: To provide a global mobile group, 6G will be integrated with satellite. Integrating terrestrial waves, satellites and public networks as one wireless communication system may be very important for 6G.

Connected intelligence: Unlike the wireless communication systems of previous generations, 6G is innovative and wireless evolution may be updated from "connected things" to "connected intelligence". AI may be applied in each step (or each signal processing procedure which will be described below) of a communication procedure.

Seamless integration of wireless information and energy transfer: A 6G wireless network may transfer power in order to charge the batteries of devices such as smartphones and sensors. Therefore, wireless information and energy transfer (WIET) will be integrated.

Ubiquitous super 3-dimemtion connectivity: Access to networks and core network functions of drones and very low earth orbit satellites will establish super 3D connection in 6G ubiquitous.

In the new network characteristics of 6G, several general requirements may be as follows.

Small cell networks: The idea of a small cell network was introduced in order to improve received signal quality as a result of throughput, energy efficiency and spectrum efficiency improvement in a cellular system. As a result, the small cell network is an essential feature for 5G and beyond 5G (5 GB) communication systems. Accordingly, the 6G communication system also employs the characteristics of the small cell network.

Ultra-dense heterogeneous network: Ultra-dense heterogeneous networks will be another important characteristic of the 6G communication system. A multi-tier network composed of heterogeneous networks improves overall QoS and reduce costs.

High-capacity backhaul: Backhaul connection is characterized by a high-capacity backhaul network in order to support high-capacity traffic. A high-speed optical fiber and free space optical (FSO) system may be a possible solution for this problem.

Radar technology integrated with mobile technology: High-precision localization (or location-based service) through communication is one of the functions of the 6G wireless communication system. Accordingly, the radar system will be integrated with the 6G network.

Softwarization and virtualization: Softwarization and virtualization are two important functions which are the bases of a design process in a 5 GB network in order to ensure flexibility, reconfigurability and programmability.

Core implementation technology of 6G system

Artificial Intelligence (AI)

Technology which is most important in the 6G system and will be newly introduced is AI. AI was not involved in the 4G system. A 5G system will support partial or very limited AI. However, the 6G system will support AI for full automation. Advance in machine learning will create a more intelligent network for real-time communication in 6G. When AI is introduced to communication, real-time data transmission may be simplified and improved. AI may determine a method of performing complicated target tasks using countless analysis. That is, AI may increase efficiency and reduce processing delay.

Time-consuming tasks such as handover, network selection or resource scheduling may be immediately performed by using AI. AI may play an important role even in M2M, machine-to-human and human-to-machine communication. In addition, AI may be rapid communication in a brain computer interface (BCI). An AI based communication system may be supported by meta materials, intelligent structures, intelligent networks, intelligent devices, intelligent recognition radios, self-maintaining wireless networks and machine learning.

Recently, attempts have been made to integrate AI with a wireless communication system in the application layer or the network layer, but deep learning have been focused on the wireless resource management and allocation field. However, such studies are gradually developed to the MAC layer and the physical layer, and, particularly, attempts to combine deep learning in the physical layer with wireless transmission are emerging. AI-based physical layer transmission means applying a signal processing and communication mechanism based on an AI driver rather than a traditional communication framework in a fundamental signal processing and communication mechanism. For example, channel coding and decoding based on deep learning, signal estimation and detection based on deep learning, multiple input multiple output (MIMO) mechanisms based on deep learning, resource scheduling and allocation based on AI, etc. may be included.

Machine learning may be used for channel estimation and channel tracking and may be used for power allocation, interference cancellation, etc. in the physical layer of DL. In addition, machine learning may be used for antenna selection, power control, symbol detection, etc. in the MIMO system.

However, application of a deep neutral network (DNN) for transmission in the physical layer may have the following problems.

Deep learning-based AI algorithms require a lot of training data in order to optimize training parameters. However, due to limitations in acquiring data in a specific channel environment as training data, a lot of training data is used offline. Static training for training data in a specific channel environment may cause a contradiction between the diversity and dynamic characteristics of a radio channel.

In addition, currently, deep learning mainly targets real signals. However, the signals of the physical layer of wireless communication are complex signals. For matching of the characteristics of a wireless communication signal, studies on a neural network for detecting a complex domain signal are further required.

Hereinafter, machine learning will be described in greater detail.

Machine learning refers to a series of operations to train a machine in order to create a machine which can perform tasks which cannot be performed or are difficult to be performed by people. Machine learning requires data and learning models. In machine learning, data learning methods may be roughly divided into three methods, that is, supervised learning, unsupervised learning and reinforcement learning.

Neural network learning is to minimize output error. Neural network learning refers to a process of repeatedly inputting training data to a neural network, calculating the error of the output and target of the neural network for the training data, backpropagating the error of the neural network from the output layer of the neural network to an input layer in order to reduce the error and updating the weight of each node of the neural network.

Supervised learning may use training data labeled with a correct answer and the unsupervised learning may use training data which is not labeled with a correct answer. That is, for example, in case of supervised learning for data classification, training data may be labeled with a category. The labeled training data may be input to the neural network, and the output (category) of the neural network may be compared with the label of the training data, thereby calculating the error. The calculated error is backpropagated from the neural network backward (that is, from the output layer to the input layer), and the connection weight of each node of each layer of the neural network may be updated according to backpropagation. Change in updated connection weight of each node may be determined according to the learning rate. Calculation of the neural network for input data and backpropagation of the error may configure a learning cycle (epoch). The learning data is differently applicable according to the number of repetitions of the learning cycle of the neural network. For example, in the early phase of learning of the neural network, a high learning rate may be used to increase efficiency such that the neural network rapidly ensures a certain level of performance and, in the late phase of learning, a low learning rate may be used to increase accuracy.

The learning method may vary according to the feature of data. For example, for the purpose of accurately predicting data transmitted from a transmitter in a receiver in a communication system, learning may be performed using supervised learning rather than unsupervised learning or reinforcement learning.

The learning model corresponds to the human brain and may be regarded as the most basic linear model. However, a paradigm of machine learning using a neural network structure having high complexity, such as artificial neural networks, as a learning model is referred to as deep learning.

Neural network cores used as a learning method may roughly include a deep neural network (DNN) method, a convolutional deep neural network (CNN) method and a recurrent Boltzmman machine (RNN) method. Such a learning model is applicable.

An artificial neural network is an example of connecting several perceptrons.

Figure 3:
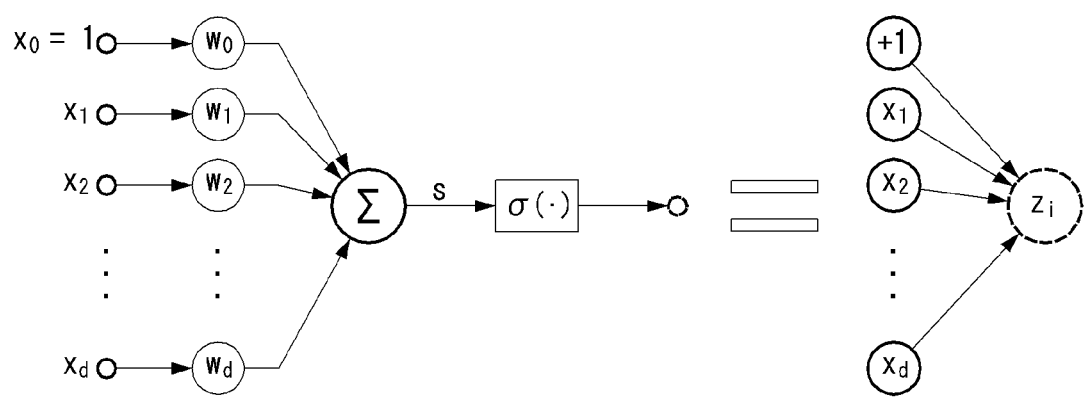
FIG. 3 illustrates a structure of a perceptron to which the method proposed in the present specification can be applied.

FIG. 3 illustrates a structure of a perceptron to which the method proposed in the present specification can be applied.

Referring to FIG. 3, when an input vector x=(x1, x2, . . . ,xd) is input, each component is multiplied by a weight (W1,W2, . . . ,Wd), and all the results are summed. After that, the entire process of applying the activation function σ(·) is called a perceptron. The huge artificial neural network structure may extend the simplified perceptron structure shown in FIG. 3 to apply input vectors to different multidimensional perceptrons. For convenience of explanation, an input value or an output value is referred to as a node.

Meanwhile, the perceptron structure illustrated in FIG. 3 may be described as being composed of a total of three layers based on an input value and an output value. An artificial neural network in which H (d+1) dimensional perceptrons exist between the 1st layer and the 2nd layer, and K (H+1) dimensional perceptrons exist between the 2nd layer and the 3rd layer, as shown in FIG. 4.

Figure 4:
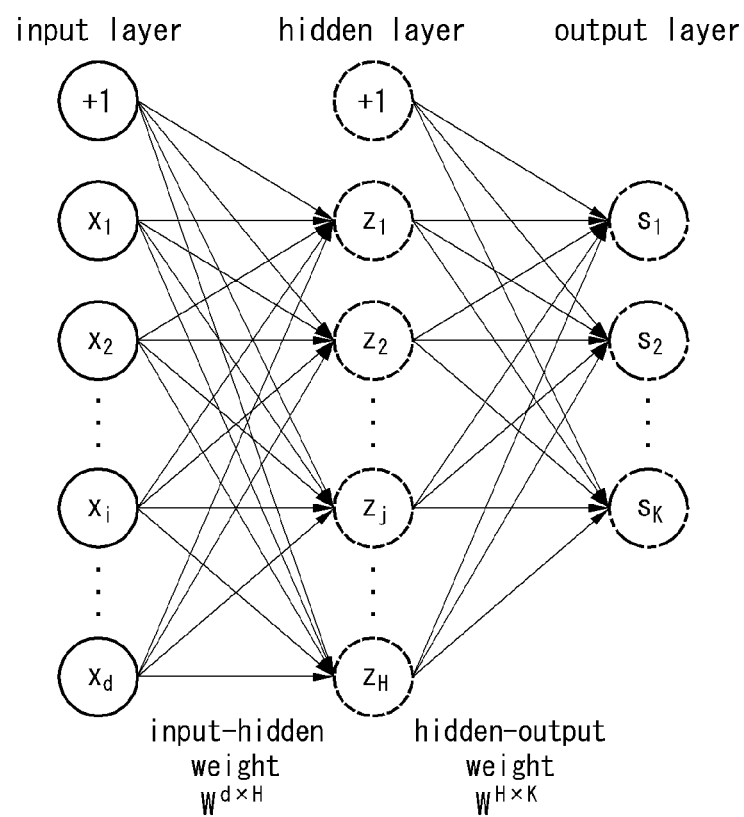
FIG. 4 illustrates the structure of a multilayer perceptron to which the method proposed in the present specification can be applied.

FIG. 4 illustrates the structure of a multilayer perceptron to which the method proposed in the present specification can be applied.

The layer where the input vector is located is called an input layer, the layer where the final output value is located is called the output layer, and all layers located between the input layer and the output layer are called a hidden layer. In the example of FIG. 4, three layers are disclosed, but since the number of layers of the artificial neural network is counted excluding the input layer, it can be viewed as a total of two layers. The artificial neural network is constructed by connecting the perceptrons of the basic blocks in two dimensions.

The above-described input layer, hidden layer, and output layer can be jointly applied in various artificial neural network structures such as CNN and RNN to be described later as well as multilayer perceptrons. The greater the number of hidden layers, the deeper the artificial neural network is, and the machine learning paradigm that uses the deep enough artificial neural network as a learning model is called Deep Learning. In addition, the artificial neural network used for deep learning is called a deep neural network (DNN).

Figure 5:
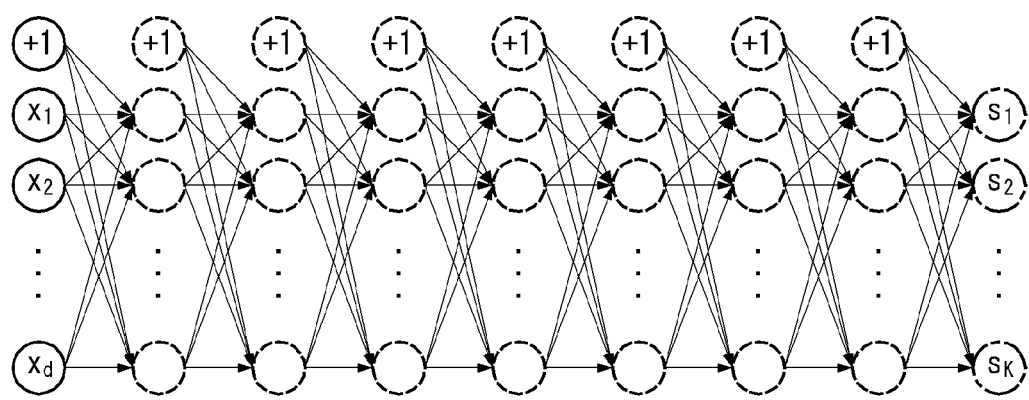
FIG. 5 illustrates a structure of a deep neural network to which the method proposed in the present specification can be applied.

FIG. 5 illustrates a structure of a deep neural network to which the method proposed in the present specification can be applied.

The deep neural network shown in FIG. 5 is a multilayer perceptron composed of eight hidden layers+output layers. The multilayer perceptron structure is expressed as a fully-connected neural network. In a fully connected neural network, a connection relationship does not exist between nodes located on the same layer, and a connection relationship exists only between nodes located on adjacent layers. DNN has a fully connected neural network structure and is composed of a combination of multiple hidden layers and activation functions, so it can be usefully applied to understand the correlation characteristics between input and output. Here, the correlation characteristic may mean a joint probability of input/output.

'On the other hand, depending on how the plurality of perceptrons are connected to each other, various artificial neural network structures different from the aforementioned DNN can be formed.

In a DNN, nodes located inside one layer are arranged in a one-dimensional vertical direction. However, in FIG. 6, it may be assumed that w nodes are arranged in two dimensions, and h nodes are arranged in a two-dimensional manner (convolutional neural network structure of FIG. 6). In this case, since a weight is added per connection in the connection process from one input node to the hidden layer, a total of h×w weights must be considered. Since there are h×w nodes in the input layer, a total of h2w2 weights are required between two adjacent layers.

Figure 6:
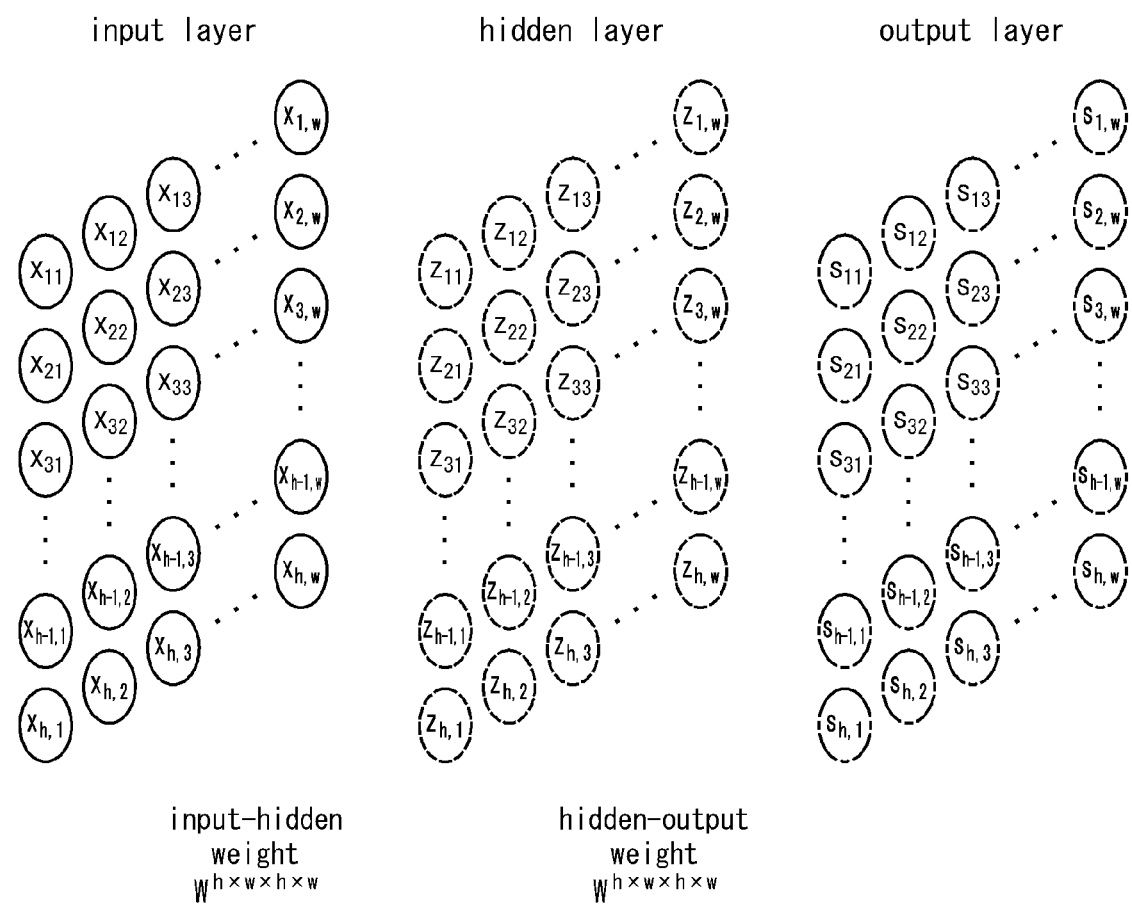
FIG. 6 illustrates the structure of a convolutional neural network to which the method proposed in the present specification can be applied.

FIG. 6 illustrates the structure of a convolutional neural network to which the method proposed in the present specification can be applied.

The convolutional neural network of FIG. 6 has a problem in that the number of weights increases exponentially according to the number of connections, so instead of considering the connection of all modes between adjacent layers, it is assumed that a filter having a small size exists. Thus, as shown in FIG. 7, weighted sum and activation function calculations are performed on a portion where the filters overlap.

One filter has a weight corresponding to the number as much as the size, and learning of the weight may be performed so that a certain feature on an image can be extracted and output as a factor. In FIG. 7, a filter having a size of 3×3 is applied to the upper leftmost 3×3 area of the input layer, and an output value obtained by performing a weighted sum and activation function operation for a corresponding node is stored in z22.

While scanning the input layer, the filter performs weighted summation and activation function calculation while moving horizontally and vertically by a predetermined interval, and places the output value at the position of the current filter. This method of operation is similar to the convolution operation on images in the field of computer vision, so a deep neural network with this structure is called a convolutional neural network (CNN), and a hidden layer generated as a result of the convolution operation. Is referred to as a convolutional layer. In addition, a neural network in which a plurality of convolutional layers exists is referred to as a deep convolutional neural network (DCNN).

Figure 7:
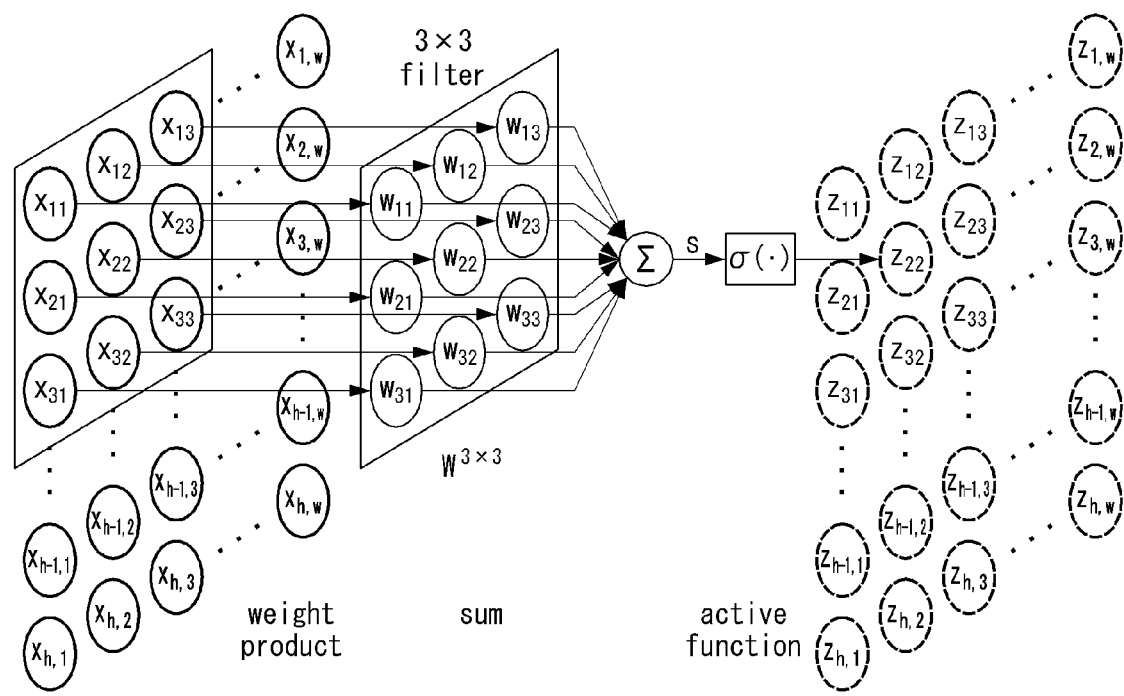
FIG. 7 illustrates a filter operation in a convolutional neural network to which the method proposed in the present specification can be applied.

FIG. 7 illustrates a filter operation in a convolutional neural network to which the method proposed in the present specification can be applied.

In the convolutional layer, the number of weights may be reduced by calculating a weighted sum by including only nodes located in a region covered by the filter in the node where the current filter is located. Due to this, one filter can be used to focus on features for the local area. Accordingly, the CNN can be effectively applied to image data processing in which the physical distance in the 2D area is an important criterion. Meanwhile, in the CNN, a plurality of filters may be applied immediately before the convolution layer, and a plurality of output results may be generated through a convolution operation of each filter.

Meanwhile, there may be data whose sequence characteristics are important according to data properties. Considering the length variability of the sequence data and the relationship between the sequence data, one element in the data sequence is input at each timestep, and the output vector (hidden vector) of the hidden layer output at a specific time point is input together with the next element in the sequence. The structure applied to the artificial neural network is called a recurrent neural network structure.

Figure 8:
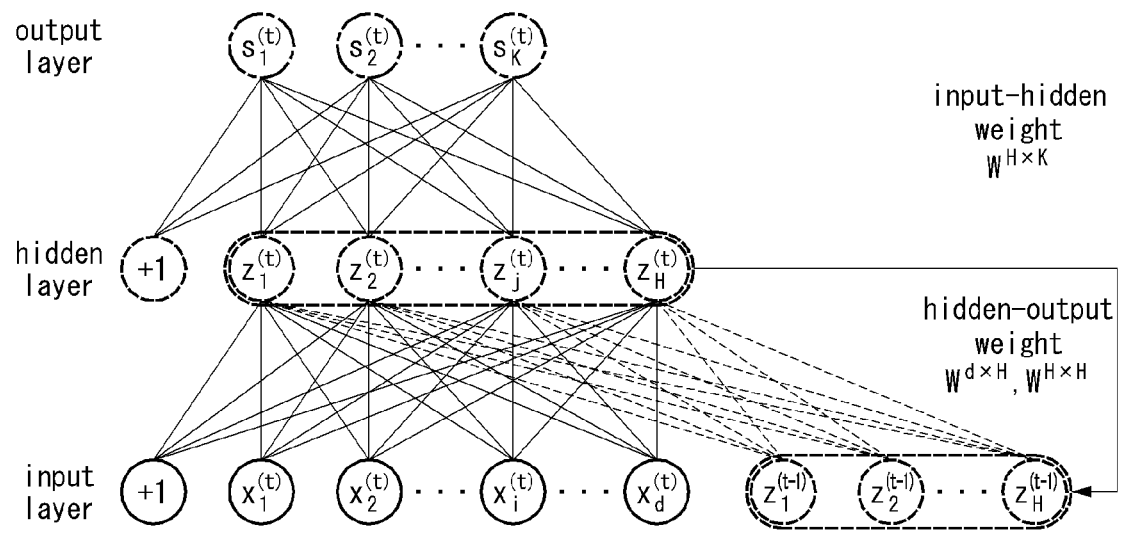
FIG. 8 illustrates a neural network structure in which a circular loop to which the method proposed in the present specification can be applied.

FIG. 8 illustrates a neural network structure in which a circular loop to which the method proposed in the present specification can be applied.

Referring to FIG. 8, a recurrent neural netwok (RNN) is a fully connected neural network with elements (x1(t), x2(t), . . . , xd(t)) of any line of sight t on a data sequence. In the process of inputting, the point t−1 immediately preceding is the weighted sum and activation function by inputting the hidden vectors (z1(t−1), z2(t−1), . . . , zH(t−1)) together. It is a structure to be applied. The reason for transferring the hidden vector to the next view in this way is that information in the input vector at the previous views is regarded as accumulated in the hidden vector of the current view.

Figure 9:
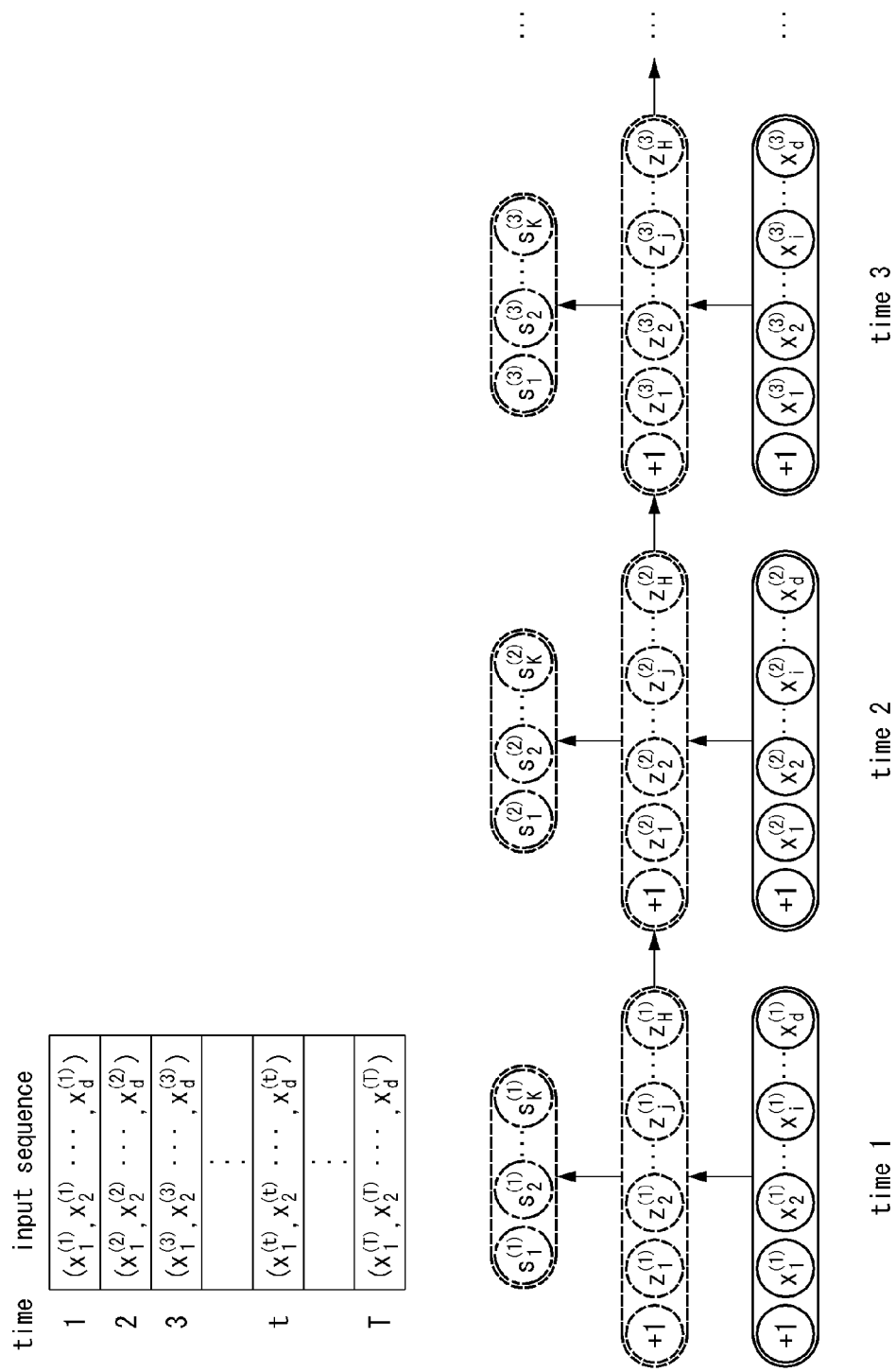
FIG. 9 illustrates an operation structure of a recurrent neural network to which the method proposed in the present specification can be applied.
Figure 10:
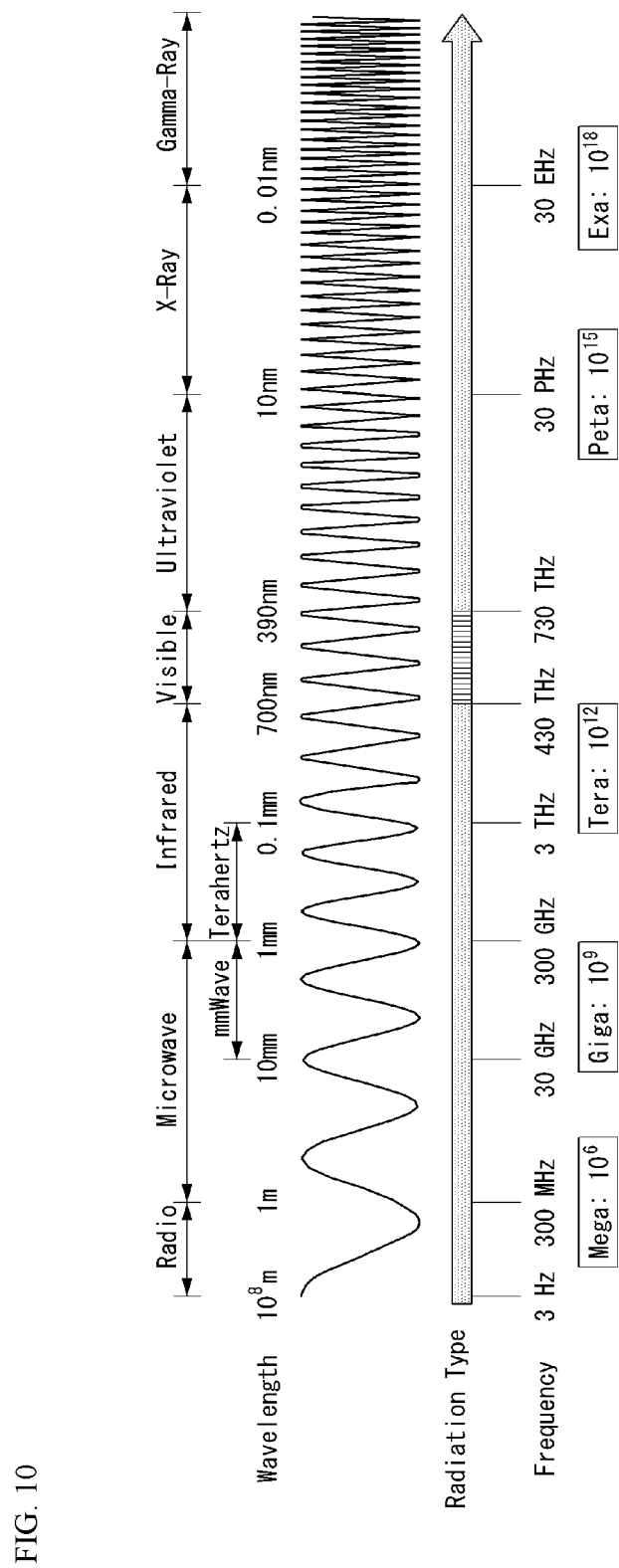
FIG. 10 is a view showing an electromagnetic spectrum applicable to the present disclosure.

FIG. 9 illustrates an operation structure of a recurrent neural network to which the method proposed in the present specification can be applied.

Referring to FIG. 9, the recurrent neural network operates in a predetermined order of time with respect to an input data sequence.

Hidden vectors (z1(1),z2(1), . . . , zH(1)) is input with the input vector (x1(2),x2(2), . . . ,xd(2)) of the time point 2, and the vector (z1(2),z2(2), . . . ,zH(2)) is determined. This process is repeatedly performed up to the time point 2, time point 3, time point T.

Meanwhile, when a plurality of hidden layers are disposed in a recurrent neural network, this is referred to as a deep recurrent neural network (DRNN). The recurrent neural network is designed to be usefully applied to sequence data (for example, natural language processing).

As a neural network core used as a learning method, in addition to DNN, CNN, and RNN, Restricted Boltzmann Machine (RBM), deep belief networks (DBN), and deep Q-networks Network), and can be applied to fields such as computer vision, speech recognition, natural language processing, and voice/signal processing.

In recent years, attempts to integrate AI with a wireless communication system have appeared, but this has been concentrated in the field of wireless resource management and allocation in the application layer, network layer, in particular, deep learning. However, such research is gradually developing into the MAC layer and the physical layer, and in particular, attempts to combine deep learning with wireless transmission in the physical layer have appeared. The AI-based physical layer transmission refers to applying a signal processing and communication mechanism based on an AI driver rather than a traditional communication framework in the fundamental signal processing and communication mechanism. For example, deep learning-based channel coding and decoding, deep learning-based signal estimation and detection, deep learning-based MIMO mechanism, AI-based resource scheduling, and It may include allocation and the like.

Terahertz (THz) Communication

THz communication is applicable to the 6G system. For example, a data rate may increase by increasing bandwidth. This may be performed by using sub-TH communication with wide bandwidth and applying advanced massive MIMO technology. THz waves which are known as sub-millimeter radiation, generally indicates a frequency band between 0.1 THz and 10 THz with a corresponding wavelength in a range of 0.03 mm to 3 mm. A band range of 100 GHz to 300 GHz (sub THz band) is regarded as a main part of the THz band for cellular communication. When the sub-THz band is added to the mmWave band, the 6G cellular communication capacity increases. 300 GHz to 3 THz of the defined THz band is in a far infrared (IR) frequency band. A band of 300 GHz to 3 THz is a part of an optical band but is at the border of the optical band and is just behind an RF band. Accordingly, the band of 300 GHz to 3 THz has similarity with RF.

The main characteristics of THz communication include (i) bandwidth widely available to support a very high data rate and (ii) high path loss occurring at a high frequency (a high directional antenna is indispensable). A narrow beam width generated in the high directional antenna reduces interference. The small wavelength of a THz signal allows a larger number of antenna elements to be integrated with a device and BS operating in this band. Therefore, an advanced adaptive arrangement technology capable of overcoming a range limitation may be used.

Optical Wireless Technology

Optical wireless communication (OWC) technology is planned for 6G communication in addition to RF based communication for all possible device-to-access networks. This network is connected to a network-to-backhaul/fronthaul network connection. OWC technology has already been used since 4G communication systems but will be more widely used to satisfy the requirements of the 6G communication system. OWC technologies such as light fidelity/visible light communication, optical camera communication and free space optical (FSO) communication based on wide band are well-known technologies. Communication based on optical wireless technology may provide a very high data rate, low latency and safe communication. Light detection and ranging (LiDAR) may also be used for ultra high resolution 3D mapping in 6G communication based on wide band.

FSO Backhaul Network

The characteristics of the transmitter and receiver of the FSO system are similar to those of an optical fiber network. Accordingly, data transmission of the FSO system similar to that of the optical fiber system. Accordingly, FSO may be a good technology for providing backhaul connection in the 6G system along with the optical fiber network. When FSO is used, very long-distance communication is possible even at a distance of 10,000 km or more. FSO supports mass backhaul connections for remote and non-remote areas such as sea, space, underwater and isolated islands. FSO also supports cellular base station connections.

Massive MIMO Technology

One of core technologies for improving spectrum efficiency is MIMO technology. When MIMO technology is improved, spectrum efficiency is also improved. Accordingly, massive MIMO technology will be important in the 6G system. Since MIMO technology uses multiple paths, multiplexing technology and beam generation and management technology suitable for the THz band should be significantly considered such that data signals are transmitted through one or more paths.

Blockchain

A blockchain will be important technology for managing large amounts of data in future communication systems. The blockchain is a form of distributed ledger technology, and distributed ledger is a database distributed across numerous nodes or computing devices. Each node duplicates and stores the same copy of the ledger. The blockchain is managed through a peer-to-peer (P2P) network. This may exist without being managed by a centralized institution or server. Blockchain data is collected together and organized into blocks. The blocks are connected to each other and protected using encryption. The blockchain completely complements large-scale IoT through improved interoperability, security, privacy, stability and scalability. Accordingly, the blockchain technology provides several functions such as interoperability between devices, high-capacity data traceability, autonomous interaction of different IoT systems, and large-scale connection stability of 6G communication systems.

3D Networking

The 6G system integrates terrestrial and public networks to support vertical expansion of user communication. A 3D BS will be provided through low-orbit satellites and UAVs. Adding new dimensions in terms of altitude and related degrees of freedom makes 3D connections significantly different from existing 2D networks.

Quantum Communication

In the context of the 6G network, unsupervised reinforcement learning of the network is promising. The supervised learning method cannot label the vast amount of data generated in 6G. Labeling is not required for unsupervised learning. Thus, this technique can be used to autonomously build a representation of a complex network. Combining reinforcement learning with unsupervised learning may enable the network to operate in a truly autonomous way.

Unmanned Aerial Vehicle

An unmanned aerial vehicle (UAV) or drone will be an important factor in 6G wireless communication. In most cases, a high-speed data wireless connection is provided using UAV technology. A base station entity is installed in the UAV to provide cellular connectivity. UAVs have certain features, which are not found in fixed base station infrastructures, such as easy deployment, strong line-of-sight links, and mobility-controlled degrees of freedom. During emergencies such as natural disasters, the deployment of terrestrial telecommunications infrastructure is not economically feasible and sometimes services cannot be provided in volatile environments. The UAV can easily handle this situation. The UAV will be a new paradigm in the field of wireless communications. This technology facilitates the three basic requirements of wireless networks, such as eMBB, URLLC and mMTC. The UAV can also serve a number of purposes, such as network connectivity improvement, fire detection, disaster emergency services, security and surveillance, pollution monitoring, parking monitoring, and accident monitoring. Therefore, UAV technology is recognized as one of the most important technologies for 6G communication.

Cell-Free Communication

The tight integration of multiple frequencies and heterogeneous communication technologies is very important in the 6G system. As a result, a user can seamlessly move from network to network without having to make any manual configuration in the device. The best network is automatically selected from the available communication technologies. This will break the limitations of the cell concept in wireless communication. Currently, user movement from one cell to another cell causes too many handovers in a high-density network, and causes handover failure, handover delay, data loss and ping-pong effects. 6G cell-free communication will overcome all of them and provide better QoS. Cell-free communication will be achieved through multi-connectivity and multi-tier hybrid technologies and different heterogeneous radios in the device.

Wireless Information and Energy Transfer (WIET)

WIET uses the same field and wave as a wireless communication system. In particular, a sensor and a smartphone will be charged using wireless power transfer during communication. WIET is a promising technology for extending the life of battery charging wireless systems. Therefore, devices without batteries will be supported in 6G communication.

Integration of Sensing and Communication

An autonomous wireless network is a function for continuously detecting a dynamically changing environment state and exchanging information between different nodes. In 6G, sensing will be tightly integrated with communication to support autonomous systems.

Integration of Access Backhaul Network

In 6G, the density of access networks will be enormous. Each access network is connected by optical fiber and backhaul connection such as FSO network. To cope with a very large number of access networks, there will be a tight integration between the access and backhaul networks.

Hologram Beamforming

Beamforming is a signal processing procedure that adjusts an antenna array to transmit radio signals in a specific direction. This is a subset of smart antennas or advanced antenna systems. Beamforming technology has several advantages, such as high signal-to-noise ratio, interference prevention and rejection, and high network efficiency. Hologram beamforming (HBF) is a new beamforming method that differs significantly from MIMO systems because this uses a software-defined antenna. HBF will be a very effective approach for efficient and flexible transmission and reception of signals in multi-antenna communication devices in 6G.

Big Data Analysis

Big data analysis is a complex process for analyzing various large data sets or big data. This process finds information such as hidden data, unknown correlations, and customer disposition to ensure complete data management. Big data is collected from various sources such as video, social networks, images and sensors. This technology is widely used for processing massive data in the 6G system.

Large intelligent surface (LIS)

In the case of the THz band signal, since the straightness is strong, there may be many shaded areas due to obstacles. By installing the LIS near these shaded areas, LIS technology that expands a communication area, enhances communication stability, and enables additional optional services becomes important. The LIS is an artificial surface made of electromagnetic materials, and can change propagation of incoming and outgoing radio waves. The LIS can be viewed as an extension of massive MIMO, but differs from the massive MIMO in array structures and operating mechanisms. In addition, the LIS has an advantage such as low power consumption, because this operates as a reconfigurable reflector with passive elements, that is, signals are only passively reflected without using active RF chains. In addition, since each of the passive reflectors of the LIS must independently adjust the phase shift of an incident signal, this may be advantageous for wireless communication channels. By properly adjusting the phase shift through an LIS controller, the reflected signal can be collected at a target receiver to boost the received signal power.

Terahertz (THz) Wireless Communications in General

THz wireless communication uses a THz wave having a frequency of approximately 0.1 to 10 THz (1 THz=1012 Hz), and may mean terahertz (THz) band wireless communication using a very high carrier frequency of 100 GHz or more. The THz wave is located between radio frequency (RF)/millimeter (mm) and infrared bands, and (i) transmits non-metallic/non-polarizable materials better than visible/infrared rays and has a shorter wavelength than the RF/millimeter wave and thus high straightness and is capable of beam convergence. In addition, the photon energy of the THz wave is only a few meV and thus is harmless to the human body. A frequency band which will be used for THz wireless communication may be a D-band (110 GHz to 170 GHz) or a H-band (220 GHz to 325 GHz) band with low propagation loss due to molecular absorption in air. Standardization discussion on THz wireless communication is being discussed mainly in IEEE 802.15 THz working group (WG), in addition to 3GPP, and standard documents issued by a task group (TG) of IEEE 802.15 (e.g., TG3d, TG3e) specify and supplement the description of this disclosure. The THz wireless communication may be applied to wireless cognition, sensing, imaging, wireless communication, and THz navigation.

Figure 11:
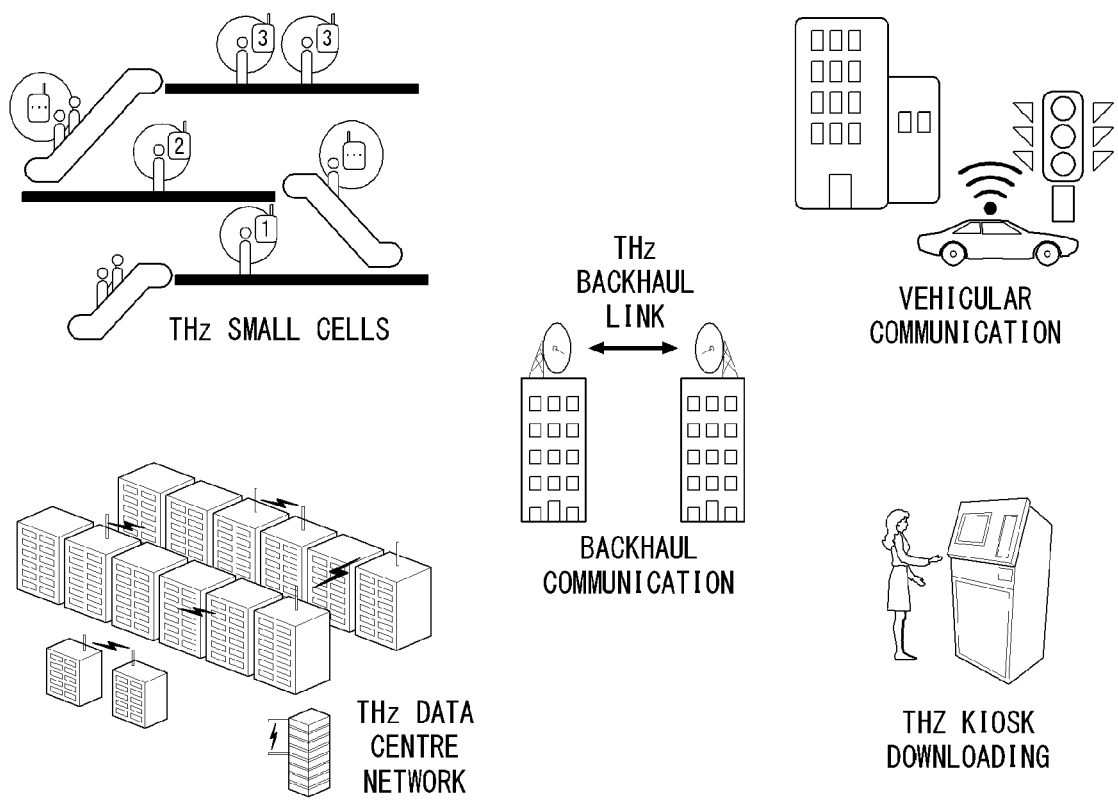
FIG. 11 is a view showing a THz communication method applicable to the present disclosure.

FIG. 11 is a view showing a THz communication method applicable to the present disclosure.

Referring to FIG. 11, a THz wireless communication scenario may be classified into a macro network, a micro network, and a nanoscale network. In the macro network, THz wireless communication may be applied to vehicle-to-vehicle (V2V) connection and backhaul/fronthaul connection. In the micro network, THz wireless communication may be applied to near-field communication such as indoor small cells, fixed point-to-point or multi-point connection such as wireless connection in a data center or kiosk downloading.

Table 2 below shows an example of technology which may be used in the THz wave.

TABLE 2

| | |
|---|---|
| Transceivers Device | Available immature: UTC-PD, RTD and SBD |
| Modulation and coding | Low order modulation techniques (OOK, QPSK), LDPC, Reed Soloman, Hamming, Polar, Turbo |
| Antenna | Omni and Directional, phased array with low number of antenna elements |
| Bandwidth | 69 GHz (or 23 GHz) at 300 GHz |
| Channel models | Partially |
| Data rate | 100 Gbps |
| Outdoor deployment | No |
| Free space loss | High |
| Coverage | Low |
| Radio Measurements | 300 GHz indoor |
| Device size | Few micrometers |

THz wireless communication can be classified based on a method for generating and receiving THz. The THz generation method can be classified as an optical device or an electronic device-based technology.

Figure 12:
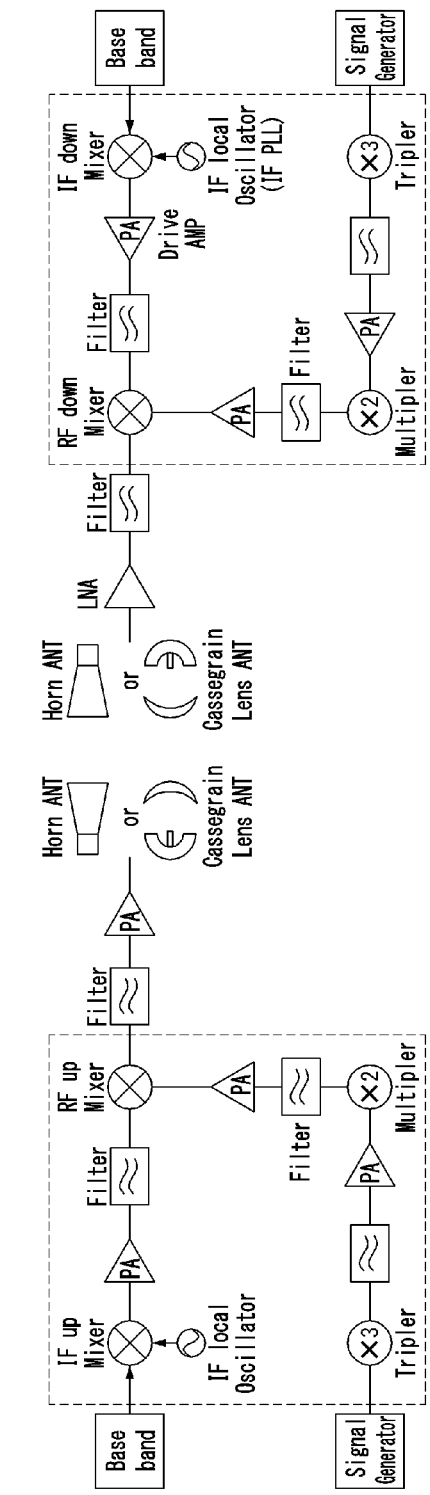
FIG. 12 is a view showing a THz wireless communication transceiver applicable to the present disclosure.

FIG. 12 is a view showing a THz wireless communication transceiver applicable to the present disclosure.

Figure 18:
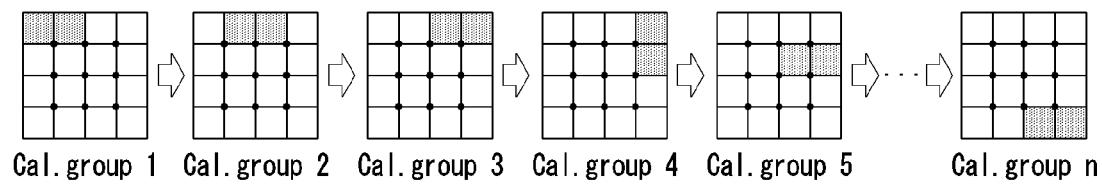
FIG. 18 is a diagram for describing an operation performed in a group unit in the calibration of an antenna array according to an embodiment of the present disclosure.

The method of generating THz using an electronic device includes a method using a semiconductor device such as a resonance tunneling diode (RTD), a method using a local oscillator and a multiplier, a monolithic microwave integrated circuit (MMIC) method using a compound semiconductor high electron mobility transistor (HEMT) based integrated circuit, and a method using a Si-CMOS-based integrated circuit. In the case of FIG. 18, a multiplier (doubler, tripler, multiplier) is applied to increase the frequency, and radiation is performed by an antenna through a subharmonic mixer. Since the THz band forms a high frequency, a multiplier is essential. Here, the multiplier is a circuit having an output frequency which is N times an input frequency, and matches a desired harmonic frequency, and filters out all other frequencies. In addition, beamforming may be implemented by applying an array antenna or the like to the antenna of FIG. 18. In FIG. 18, IF represents an intermediate frequency, a tripler and a multiplier represents a multiplier, PA represents a power amplifier, and LNA represents a low noise amplifier, and PLL represents a phase-locked loop.

Figure 13:
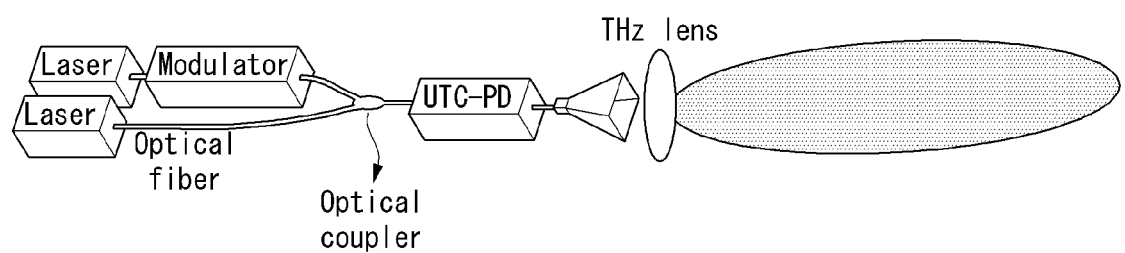
FIG. 13 is a view showing a THz signal generation method applicable to the present disclosure.
Figure 14:
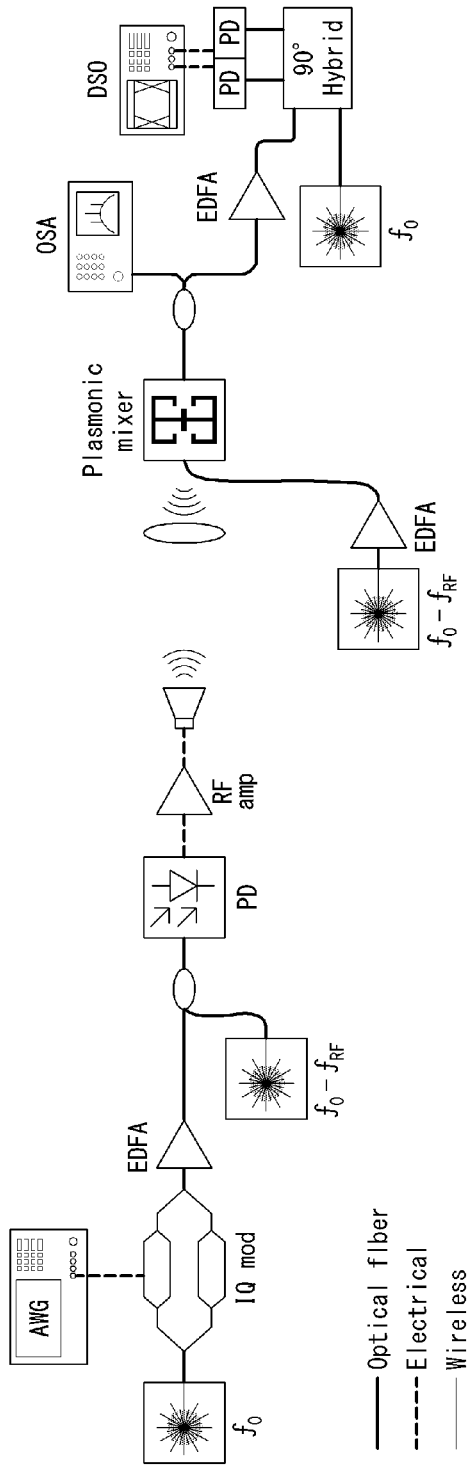
FIG. 14 is a view showing a wireless communication transceiver applicable to the present disclosure.

FIG. 13 is a view showing a THz signal generation method applicable to the present disclosure and FIG. 14 is a view showing a wireless communication transceiver applicable to the present disclosure.

Referring to FIGS. 13 and 14, the optical device-based THz wireless communication technology means a method of generating and modulating a THz signal using an optical device. The optical device-based THz signal generation technology refers to a technology that generates an ultra-high-speed optical signal using a laser and an optical modulator, and converts it into a THz signal using an ultrahigh-speed photodetector. This technology is easy to increase the frequency compared to the technology using only the electronic device, can generate a high-power signal, and can obtain a flat response characteristic in a wide frequency band. In order to generate the THz signal based on the optical device, as shown in FIG. 13, a laser diode, a broadband optical modulator, and an ultrahigh-speed photodetector are required. In the case of FIG. 13, the light signals of two lasers having different wavelengths are combined to generate a THz signal corresponding to a wavelength difference between the lasers. In FIG. 13, an optical coupler refers to a semiconductor device that transmits an electrical signal using light waves to provide coupling with electrical isolation between circuits or systems, and a uni-travelling carrier photo-detector (UTC-PD) is one of photodetectors, which uses electrons as an active carrier and reduces the travel time of electrons by bandgap grading. The UTC-PD is capable of photodetection at 150 GHz or more. In FIG. 14, an erbium-doped fiber amplifier (EDFA) represents an optical fiber amplifier to which erbium is added, a photo detector (PD) represents a semiconductor device capable of converting an optical signal into an electrical signal, and OSA represents an optical sub assembly in which various optical communication functions (e.g., photoelectric conversion, electrophotic conversion, etc.) are modularized as one component, and DSO represents a digital storage oscilloscope.

Figure 16:
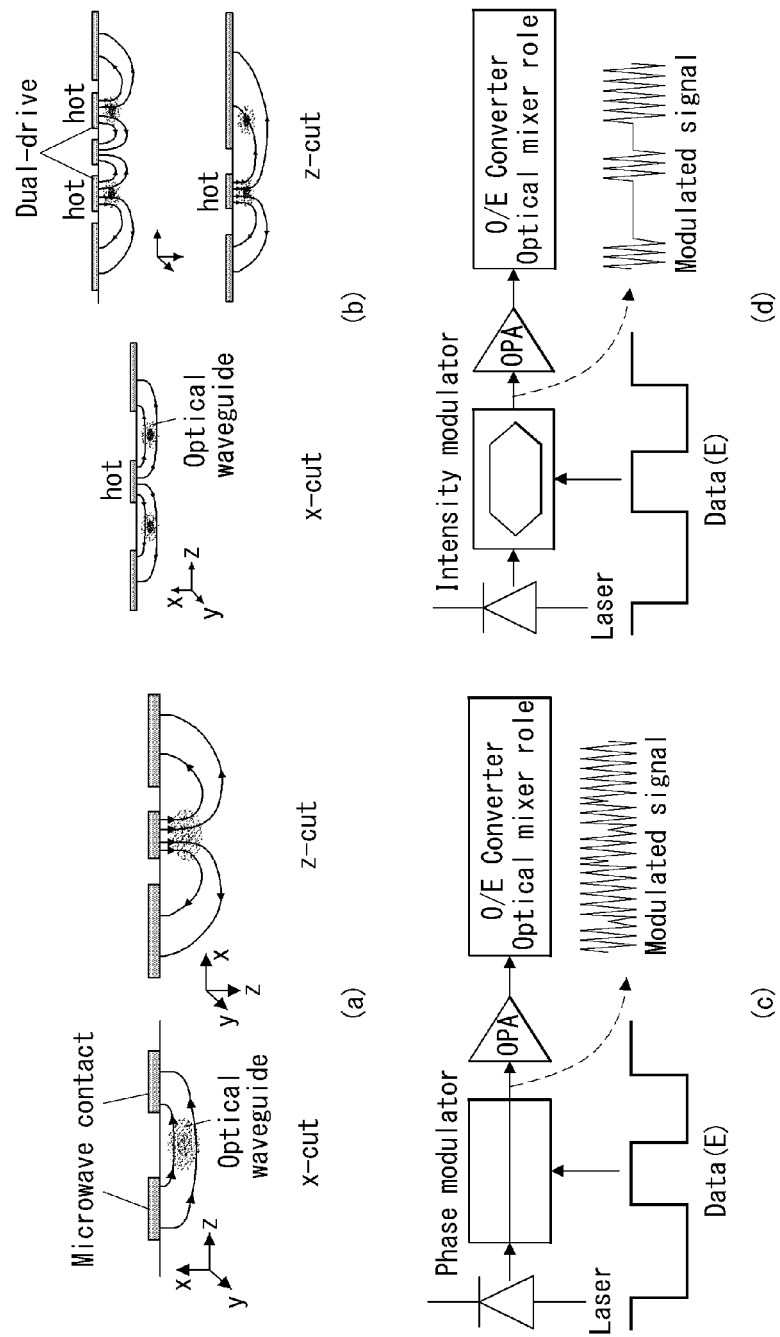
FIG. 16 is a view showing a modulator structure applicable to the present disclosure.

The structure of a photoelectric converter (or photoelectric converter) will be described with reference to FIGS. 15 and 16. FIG. 15 is a view showing a transmitter structure applicable to the present disclosure. FIG. 16 is a view showing a modulator structure applicable to the present disclosure.

generally, the optical source of the laser may change the phase of a signal by passing through the optical wave guide. At this time, data is carried by changing electrical characteristics through microwave contact or the like. Thus, the optical modulator output is formed in the form of a modulated waveform. A photoelectric modulator (O/E converter) may generate THz pulses according to optical rectification operation by a nonlinear crystal, photoelectric conversion (O/E conversion) by a photoconductive antenna, and emission from a bunch of relativistic electrons. The terahertz pulse (THz pulse) generated in the above manner may have a length of a unit from femto second to pico second. The photoelectric converter (O/E converter) performs down conversion using non-linearity of the device.

Given THz spectrum usage, multiple contiguous GHz bands are likely to be used as fixed or mobile service usage for the terahertz system. According to the outdoor scenario criteria, available bandwidth may be classified based on oxygen attenuation 10^2 dB/km in the spectrum of up to 1 THz. Accordingly, a framework in which the available bandwidth is composed of several band chunks may be considered. As an example of the framework, if the length of the terahertz pulse (THz pulse) for one carrier (carrier) is set to 50 ps, the bandwidth (BW) is about 20 GHz.

Effective down conversion from the infrared band to the terahertz band depends on how to utilize the nonlinearity of the O/E converter. That is, for down-conversion into a desired terahertz band (THz band), design of the photoelectric converter (O/E converter) having the most ideal nonlinearity to move to the corresponding terahertz band (THz band) is required. If a photoelectric converter (O/E converter) which is not suitable for a target frequency band is used, there is a high possibility that an error occurs with respect to the amplitude and phase of the corresponding pulse.

In a single carrier system, a terahertz transmission/reception system may be implemented using one photoelectric converter. In a multi-carrier system, as many photoelectric converters as the number of carriers may be required, which may vary depending on the channel environment. Particularly, in the case of a multi-carrier system using multiple broadbands according to the plan related to the above-described spectrum usage, the phenomenon will be prominent. In this regard, a frame structure for the multi-carrier system can be considered. The down-frequency-converted signal based on the photoelectric converter may be transmitted in a specific resource region (e.g., a specific frame). The frequency domain of the specific resource region may include a plurality of chunks. Each chunk may be composed of at least one component carrier (CC).

The aforementioned contents may be combined with subsequent embodiments proposed in the present disclosure and applied or may be supplemented to clarify technical characteristics of the embodiments proposed in the present disclosure. Hereinafter, the embodiments to be described hereinafter have been divided for convenience of description only, and some elements of any one embodiment may be substituted with some elements of another embodiment or may be mutually combined and applied.

Hereinafter, in the present disclosure, embodiments in which upon beamforming using an array antenna, more precise beamforming is made possible by calibrating phase and gain errors occurring between RF chains are described. Specifically, the calibration of an antenna array may be performed as follows. A coupling antenna for detecting a signal is disposed around the array antenna. The signal detected by the coupling antenna is analyzed by a power detector. A feedback signal for offsetting an error occurred upon transmission of a signal may be generated based on the output (i.e., analyzed signal) of the power detector. The calibration of the antenna array may be performed based on the feedback signal.

Hereinafter, contents related to problems of a conventional technology in relation to the calibration of an antenna array are described.

In the conventional technology, phase and gain errors are estimated based on a signal detected by a coupling antenna (or line coupler) for detecting a signal. To this end, a separate circuit including a down-conversion mixer is used. The down-conversion mixer converts a signal, converted into a signal of a carrier frequency (several GHz or more), into a baseband signal and outputs the baseband signal so that information included in the signal (including phase and gain errors) can be analyzed.

In such a conventional technology, however, as the frequency is increased, a cost and a design level of difficulty are increased upon design of the down-conversion mixer. In general, if the operating frequency of a design RF circuit (including the down-conversion mixer) is increased, a cost and a design level of difficulty are increased because a process needs to become fine and sensitive performance may be changed with respect to a small error. Accordingly, a phase detection method using the down-conversion mixer was limited to a relatively low frequency band (several GHz or less). Recently, with the development of the circuit design and process technology, such an attempt is made even in a 28 GHz band. In this case, in the 28 GHz band to be used as a 5G frequency or a higher band thereof (6G, THz), if a calibration circuit including such a down-conversion mixer is added to a UE or base station for communication, it is expected that it will be difficult for such a conventional method to be commercialized in the THz band because a cost is high and a design level of difficulty is increased.

In another conventional technology, calibration is performed by estimating the phase and gain error of a signal, received by a reception stage in a specific situation, based on an accurately estimated channel environment. The aforementioned specific situation means a situation in which only one phase shifter is varied on all RF paths. The conventional technology has the following problems in being used in the THz band.

1) The accurate estimation of a channel environment is difficult in the THz band. That is, in the corresponding technology, the accuracy of a proposed compensation scheme is decreased if the accuracy of channel estimation is decreased because phase and gain errors are estimated based on a channel estimation value. In a current technology level, it is very difficult to obtain accurate channel information in the THz band.

2) If the number of antennas included in an array antenna is many, there is a difficulty in performing a calibration task because a change is very small from the viewpoint of a reception stage. The technology is a method of changing only the input of one of all phase shifters and performing calibration by detecting such a change in a reception stage. If the number of antennas included in an array antenna is several hundreds or several thousands or more, a degree of a change from the viewpoint of all antenna transmission signals may be very small. Actually, there is a case using 1000 antenna arrays or more in order to overcome a path loss in 140 GHz. It is essential to use a high gain antenna. In order to design an antenna having a high gain characteristic, a method of increasing the physical size of the antenna or the number of arrays is used. Among them, the method of increasing the number of arrays is dominant because it enables electronic beam steering.

Hereinafter, the following embodiment of the present disclosure is related to a method of calibrating the phase and gain errors of an array antenna, which can be effectively performed in an environment having a frequency of THz or more. The corresponding embodiment has an object of reducing unnecessary radiation and enabling precise beamforming by reducing a side lobe and preventing a beam tilting phenomenon. If the side lobe is increased, radiation is generated in an unwanted direction and may act as interference with a UE located in the corresponding direction. Furthermore, if beam tilting occurs due to the phase error of a beamformer, a reception stage that tries to transmit a signal cannot receive sufficient power. In both cases, communication quality is degraded because a signal to noise ratio (SNR) is reduced.

For the calibration of an antenna array, the following method may be taken into consideration.

A calibration task may be performed by estimating the phase and gain errors of an antenna using a power detector having a relatively simple structure instead of a down-conversion mixer and feeding the estimated error value back. The calibration task may be assigned as a separate symbol for calibration within one frame structure and performed in real time during a communication situation. Hereinafter, this is described in detail with reference to FIG. 17.

Figure 17:
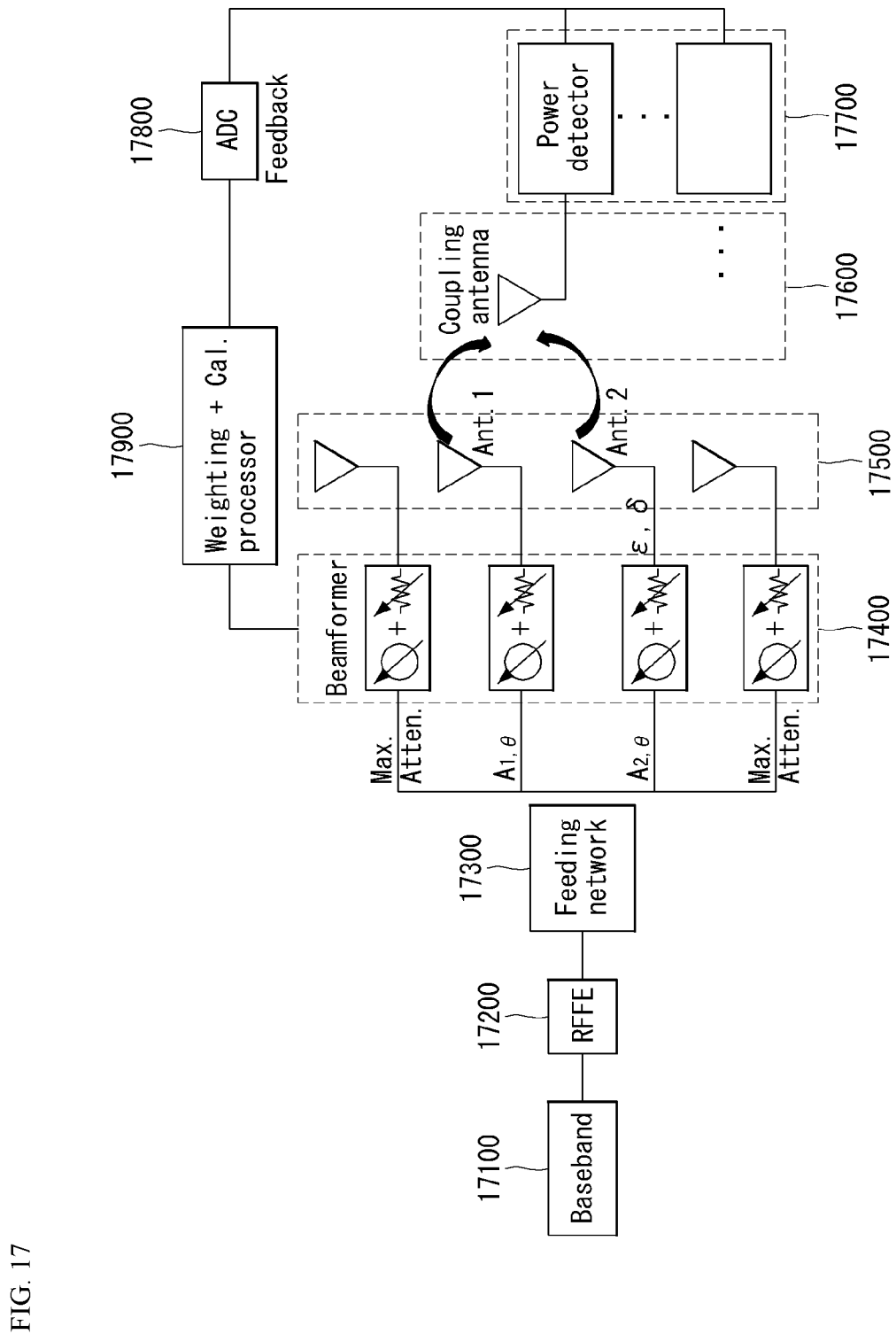
FIG. 17 illustrates the structure of an apparatus for calibrating an array antenna according to an embodiment of the present disclosure.

FIG. 17 illustrates the structure of an apparatus for calibrating an array antenna according to an embodiment of the present disclosure.

Referring to FIG. 17, the apparatus for calibrating an array antenna may include a baseband processor 17100, an RF front end (RFFE) 17200, a feeding network 17300, a beamformer 17400, an antenna 17500, a coupling antenna 17600, a power detector 17700, an analog to digital converter (ADC) 17800, and a calibration processor 17900.

The calibration apparatus may be implemented by an apparatus of FIGS. 29 to 33 to be described later. For example, in the case of the apparatus of FIG. 30, the calibration apparatus may be based on a wireless device 100/200.

The baseband processor 17100 generates a baseband signal.

The RFFE 17200 converts a baseband signal into a radio signal or converts, into a baseband signal, a radio signal received through the antenna 17500.

The feeding network 17300 distributes a signal and/or power. Specifically, the feeding network 17300 provides each antenna 17500 with a signal and/or power having the same size and phase.

The beamformer 17400 forms a beam. Beamforming is described in detail below.

The existing beamforming technology using multiple antennas may be divided into an analog beamforming scheme and a digital beamforming scheme depending on the location where a beamforming weight vector/precoding vector is applied.

The analog beamforming scheme is a beamforming scheme applied to a multi-antenna structure. This scheme may mean a scheme for branching, into multiple paths, an analog signal on which the processing of a digital signal has been completed and forming a beam by applying a phase shifter (PS) and power amplifier (PA) configuration to each of the paths.

For the analog beamforming, there is a need for a structure in which a PA and PS coupled to each antenna processes an analog signal derived from one digital signal. In other words, the beamformer 17400 includes a PS and a PA and processes a complex weight.

The antenna 17500 transmits a radio signal based on a beam formed by the beamformer 17400. The antenna 17500 may be based on a plurality of antennas. The antenna 17500 may be based on an array antenna including a plurality of antennas.

The coupling antenna 17600 measures a radio signal transmitted by the antenna 17500. The coupling antenna 17600 may be based on a plurality of coupling antennas. The coupling antenna 17600 may be disposed at a specific location for the calibration of the antenna 17500. For example, a plurality of the coupling antennas 17600 may be disposed in one row or one column parallel to a specific row and specific column of the array antenna 17500, respectively. This is described in detail later with reference to FIG. 26.

The power detector 17700 is coupled to the coupling antenna 17600. The power detector 17700 analyzes the signal of the coupling antenna 17600 and outputs the analyzed signal. According to an embodiment, the power detector 17700 may be based on a plurality of the power detectors 17700 coupled to a plurality of the coupling antennas 17600, respectively.

The ADC 17800 converts an analog signal into a digital signal. Specifically, the ADC 17800 converts the output of the power detector 17700 into a digital signal and outputs the digital signal to the calibration processor 17900.

The calibration processor 17900 estimates an error of the antenna 17500. In this case, the error may be related to the phase and/or gain of a radio signal. Specifically, the calibration processor 17900 estimates an error of the antenna 17500 based on the results of measurement of the radio signal. The result of the measurement of the radio signal may be based on the output of the power detector 17700. In this case, the output of the power detector 17700 may mean an output digitally converted by the ADC 17800.

The calibration of the antenna 17500 may be performed by the calibration apparatus in order of 1) to 4) below.

1) A maximum attenuation value is applied to the remaining two beamformers of four beamformers 17400 except two beamformers. Four pairs of gains and phases A, θ that have been previously defined are sequentially input to the remaining two beamformers. In other words, a radio signal based on a predefined gain and phase may be repeatedly transmitted four times through the two antennas 17500.

2) A signal received through the coupling antenna 17600 with respect to each input is input to the calibration processor 17900 in a digital value form via the power detector 17700 and the ADC 17800.

Specifically, the coupling antenna 17600 measures the radio signal. The measured signal may be represented as Equation 1. In Equation 1, $C_{ant.1}$ is a signal of the first antenna 17500, that is, a reference (Equation 2), and $C_{ant.2}$ is a signal of the second antenna 17500, that is, a target of calibration (Equation 3).

$$C = C_{ant.1} + C_{ant.2} \quad \text{[Equation 1]}$$

$$C_{ant.1} = \alpha_0 e j\varphi * A_1 p e^{j\theta_{i1}} \quad \text{[Equation 2]}$$

$$C_{ant.2} = \alpha_0 e j\varphi * A_2 (1+\varepsilon) p e^{j(\theta_2+\delta)}$$

In Equation 2 and Equation 3, $\alpha_0$ and $\varphi$ correspond to common attenuation and a phase change, respectively, occurring due to all RF paths and the coupling antenna. $A_1$ and $A_2$ are gain change values (input values) through the variable attenuation of the beamformer 17400. $\theta_1$ and $\theta_2$ correspond to phase change values (input values) through the phase change of the beamformer 17400. P is a predetermined pilot signal.

In Equation 3, $\varepsilon$ is an error of a gain in all RF paths, which occurs in common with respect to all the inputs (A, θ). $\delta$ is an error of a phase in all RF paths, which occurs in common with respect to all the inputs (A, θ). The $\varepsilon$ and the $\delta$ correspond to the finally estimated errors. Accordingly, an error estimated based on an embodiment of the present disclosure may include at least one of the $\varepsilon$ or the $\delta$.

The output of the power detector 17700 may be represented as Equation 4.

$$V_{out} = |C|^2 = |\alpha_0 e j\varphi * (A_1 e^{j\theta_1} + A_2(1+\varepsilon) p e^{j(\theta_2+\delta)})|^2 = \alpha^2$$
$$[A_1^2 + A_2^2(1+\varepsilon)^2 + 2A_1 A_2 [\cos(\theta_1-\theta_2)\cos\delta - \sin(\theta_1-\theta_2)\sin\delta]] \quad \text{[Equation 4]}$$

In Equation 4, α is $\alpha_0 + p$.

3) The calibration processor 17900 estimates the gain and phase errors (ε, δ) of the second antenna 17500 based on the output of the power detector 17700.

The output of the power detector 17700 may be based on the measurement of the coupling antenna 17600 with respect to a radio signal that is repeatedly transmitted four times based on a predefined gain and phase. The estimation of an error performed based on the measurement of the radio signal is described with reference to ① to ④ below.

Hereinafter, ① to ④ may correspond to turns in which radio signals are transmitted, respectively.

① $A_1$ and $A_2$, that is, values for the adjustment of a gain of the radio signal, may be 1 and 0, respectively. $\theta_1$ and $\theta_2$, that is, values for the phase of the radio signal, may be 0 and 0, respectively.

In this case, the output of the power detector 17700 may be based on $V_{out}$ (1<0°, 0<0°) 0∥. . Since $V_{out}$ is $\alpha^2$, α is estimated.

② $A_1$ and $A_2$, that is, values for the adjustment of a gain of the radio signal, may be 0 and 1, respectively. $\theta_1$ and $\theta_2$, that is, values for the phase of the radio signal, may be 0 and 0, respectively.

In this case, the output of the power detector 17700 may be based on $V_{out}$ (0<0°, 0<0°). Since $V_{out}$ is $(1+\varepsilon)^2$, ε is estimated.

③ $A_1$ and $A_2$, that is, values for the adjustment of a gain of the radio signal, may be 1 and 1, respectively. $\theta_1$ and $\theta_2$, that is, values for the phase of the radio signal, may be 0 and 0, respectively.

In this case, the output of the power detector 17700 may be based on $V_{out}$(0<0°, 0<0°). Since $V_{out}$ is $\alpha_0^2[1^2+1^2(1+\varepsilon)^2+2\cos\theta$, cos θ is estimated.

④ Since all the values for the estimation of an error of the second antenna in addition to sin δ have been calculated through the three operations, a certain value may be input as an adjustment value for the adjustment of a gain and phase of the radio signal. In this case, sin δ is estimated based on the output of the power detector 17700 and the calculated α, ε and cos δ.

In this case, the phase error 5 of the second antenna 17500 may be calculated based on Equation 5 below.

[Equation 5]

$$\delta = \tan^{-1}\frac{\sin\delta}{\cos\delta}$$

As described above, the errors (ε, δ) of the second antenna 17500 may be estimated.

4) The estimated errors (ε, δ) are fed back to the beamformer 17400, so the phase and gain errors occurred between the RF paths are calibrated.

The operations 1) to 4) may be repeated until the calibration of the antenna 17500 is fully completed.

In an implementation aspect, the apparatus for calibrating an array antenna according to an embodiment of the present disclosure may be implemented based on the apparatus of FIGS. 29 to 33.

Figure 30:
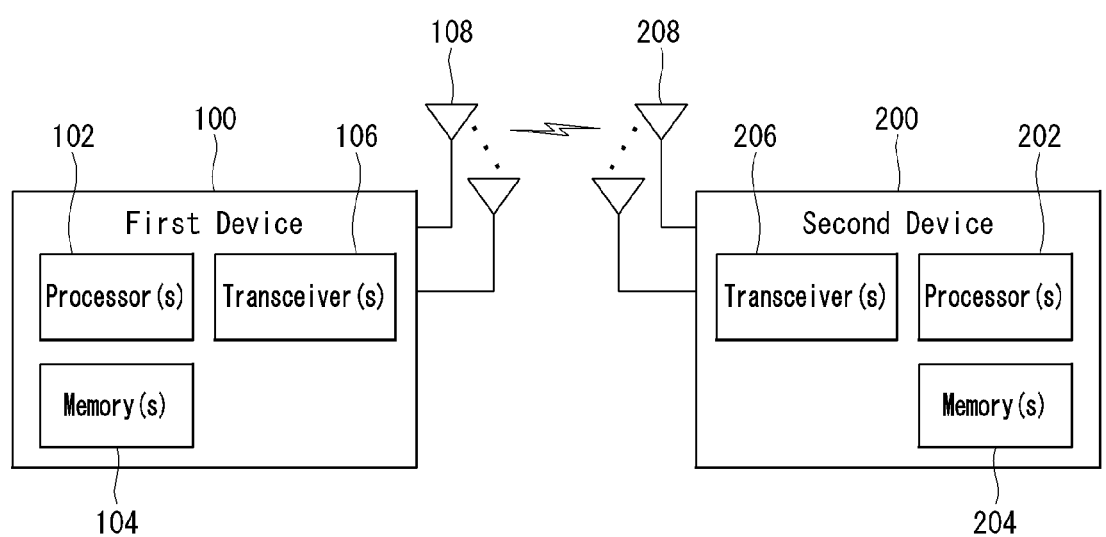
FIG. 30 illustrates wireless devices applicable to the present disclosure.

Hereinafter, the apparatus of FIG. 30 is taken as an example.

The calibration apparatus may be implemented in the wireless device 100/200. For example, the wireless device 100/200 of FIG. 30 may include the baseband processor 17100, the RFFE 17200, the feeding network 17300, the beamformer 17400, the antenna 17500, the coupling antenna 17600, the power detector 17700, the ADC 17800, and the calibration processor 17900.

The baseband processor 17100, the RFFE 17200, the feeding network 17300, and the beamformer 17400 may be implemented in a transceiver 106/206 of FIG. 30.

The antenna 17500 may be implemented in an antenna 108/208 of FIG. 30.

The calibration processor 17900 may be implemented in the processor 102/202 of FIG. 30. The aforementioned operation of the calibration apparatus (e.g., the calibration method of the antenna) may be processed by the processor 102/202 of FIG. 30. Specifically, the calibration method of the antenna may be stored in a memory (e.g., a memory 104/204 of FIG. 30) in the form of an instruction/program (e.g., instruction or executable code) for driving at least one processor (e.g., the processor 102/202 of FIG. 30).

Hereinafter, a configuration related to the calibration is described.

For the calibration of an antenna, scrambling/descrambling may be performed. Specifically, a transmission stage may transmit a scrambled symbol (e.g., radio signal) for calibration. A reception stage may perform the calibration of the antenna in a specific time interval using a descrambled signal. The symbol for calibration may be configured through RRC.

Hereinafter, contents related to calibration for each group and a system structure, in relation to the aforementioned calibration of the antenna, are described in detail.

FIG. 18 is a diagram for describing an operation performed in a group unit in the calibration of an antenna array according to an embodiment of the present disclosure.

Referring to FIG. 18, the entire antenna array may be divided into a plurality of groups, and calibration may be sequentially performed for each group. This is more specifically described later with reference to FIGS. 24 to 26.

Figure 19:
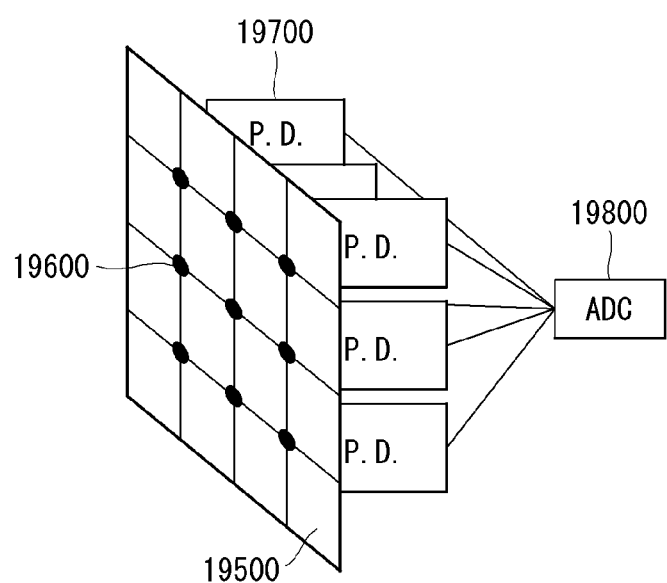
FIG. 19 illustrates the structure of a system for calibrating an array antenna according to an embodiment of the present disclosure.

FIG. 19 illustrates the structure of a system for calibrating an array antenna according to an embodiment of the present disclosure.

Referring to FIG. 19, the array antenna includes a total of 16 antennas 19500. A coupling antenna 19600 is disposed at the center of four antennas 19500. A power detector 19700 is coupled to each of 9 coupling antennas 19600 in order to minimize a power loss. The 9 power detectors 19700 are coupled to one ADC 19800.

A signal from the coupling antenna 19600 to the power detector 19700 is a high frequency RF signal. A signal from the power detector 19700 to the ADC 19800 is a direct current (CD) component signal. The RF signal has a great line loss, and has a higher line fabrication cost and higher design level of difficulty than the DC signal. Furthermore, the ADC is a device having a high cost and design complexity among the elements of a transceiver.

In order to reduce system complexity, one power detector 19700 is coupled to one coupling antenna 19600. The plurality of power detectors 19700 is coupled to one ADC 19800. Accordingly, the length of an RF line and the number of required ADCs can be minimized.

Hereinafter, contents related to the verification of an antenna calibration method based on the present embodiment are described.

Figure 20:
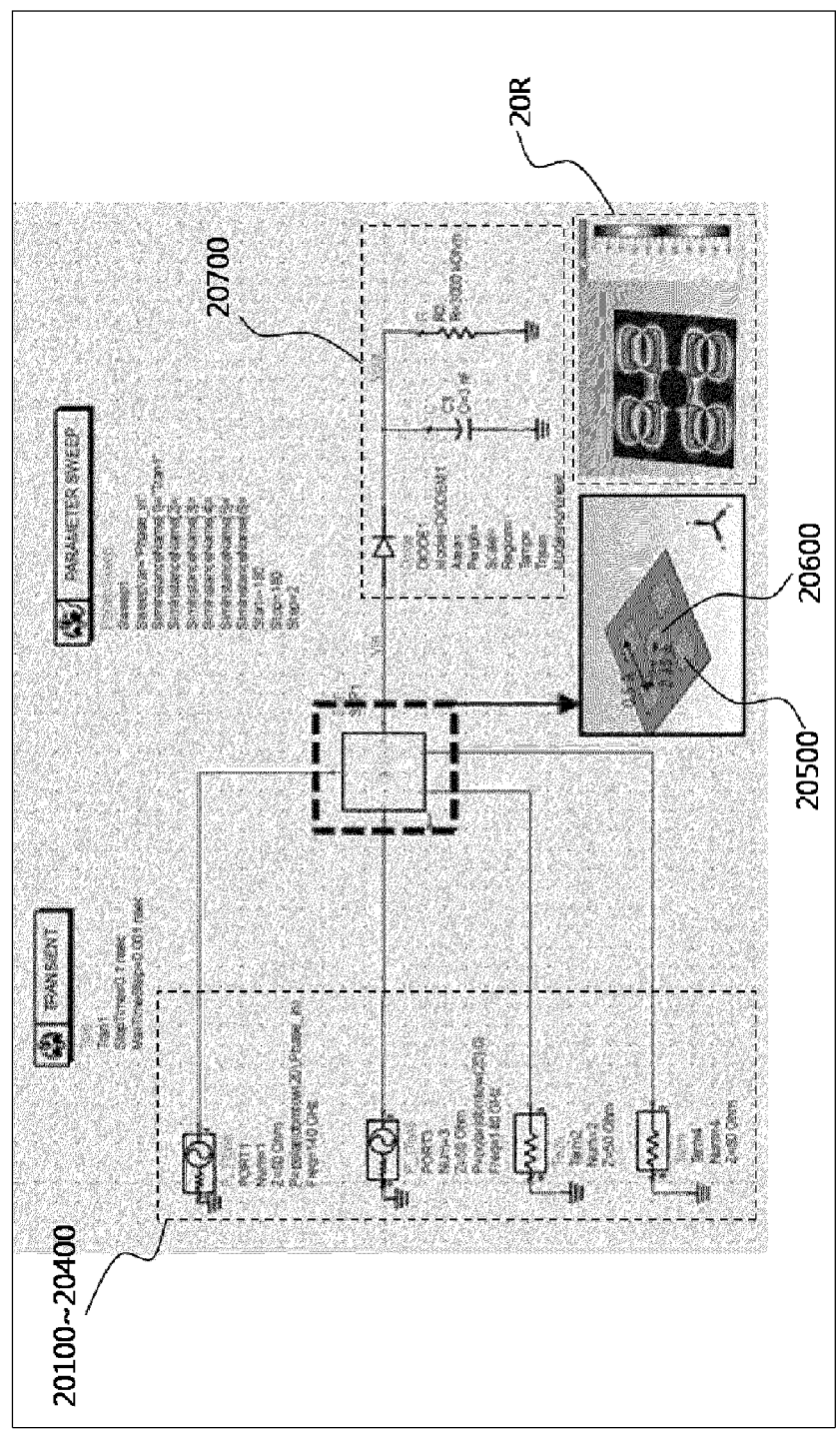
FIG. 20 is a diagram for describing the results of simulations of the calibration of an antenna array according to an embodiment of the present disclosure.

FIG. 20 is a diagram for describing the results of simulations of the calibration of an antenna array according to an embodiment of the present disclosure.

Experiments for verifying the aforementioned calibration method of an antenna were performed in an environment configured like FIG. 20. 20R indicates the results of execution of simulations of three-dimensional electromagnetic waves. The results output from the electromagnetic wave simulations were extracted and input to an RF circuit simulation tool in a black box form (dotted line). The entire system was simulated.

Four ports on the left of FIG. 20 mean signal sources input through four antennas, respectively, and may correspond to a baseband processor 20100, an RFFE 20200, a feeding network 20300, and a beamformer 20400, respectively.

Input signals are input to the two ports on the upper side, but a signal is not input to the two ports on the lower side. Each of the input and output ports of the system is set to 50Ω so that a reflection wave is not present. In the simulation environment, a signal is applied to each of the ports in a (size, phase) form. The highest port of the four ports is set to have a size of 20 dBm and a phase value of Phase_in° (variable) as its input. The second port of the four ports is set to have a size of 20 dBm and a phase value of 0° as its input. The remaining two ports are set to have the size and phase of 0.

In FIG. 20, a box within a red dotted line to which the four ports are coupled is configured with four antennas 20500, each one having a square patch form, and one coupling antenna 20600 having a circular patch form. Four lines output from the four ports and coupled to the box become the inputs of the four antennas 20500. One line output to the right side of the box is the output of the coupling antenna 20600. An output, output along a line coupled to the right of the red dotted line box, is a signal when transmission signals from the four antennas 20500 are received through the one coupling antenna 20600 at the center of the box. The corresponding signal is transmitted to a power detector 20700. An output value of the power detector 20700 corresponds to Vout in Equation 4. Hereinafter, the results of simulations according to the experiment environment are described with reference to FIG. 21.

Figure 21:
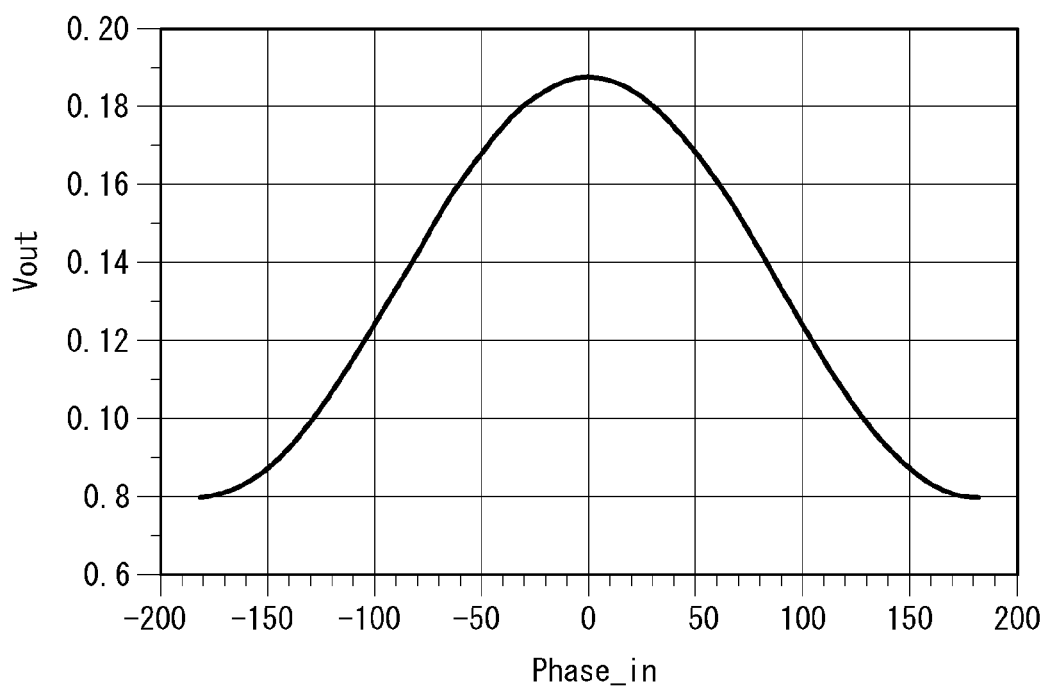
FIG. 21 is a graph illustrating the output of a power detector related to the calibration of an antenna array according to an embodiment of the present disclosure.

FIG. 21 is a graph illustrating the output of a power detector related to the calibration of an antenna array according to an embodiment of the present disclosure.

Referring to FIG. 21, an X axis indicates values (−180°~180°) of the Phase_in. A Y axis is a DC voltage value output by the power detector 20700 as Vout. The results are the same as the results obtained based on Equation 1 to X5. Corresponding simulations were performed in 140 GHz corresponding to the THz band (precisely sub-THz band) which may be used as a frequency band for 6G communication.

Hereinafter, the conventional technology and the embodiments of the present disclosure are compared and described in terms of the complexity of an implementation with reference to FIGS. 22 and 23.

Figure 22:
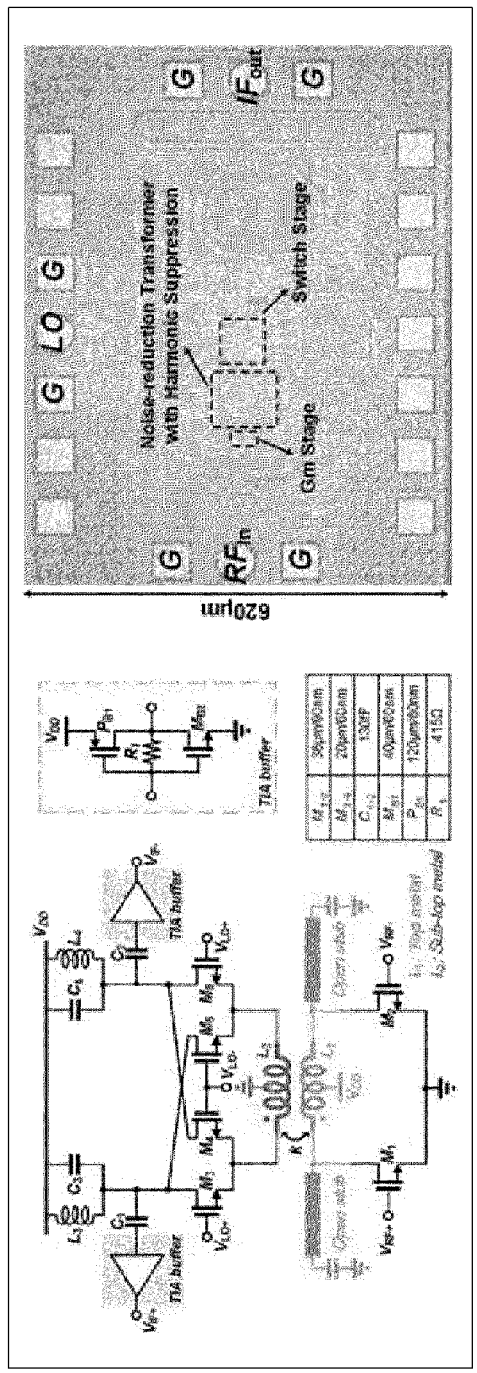
FIG. 22 is a diagram for describing an implementation method for the calibration of an antenna array according to a conventional technology.

FIG. 22 is a diagram for describing an implementation method for the calibration of an antenna array according to a conventional technology. FIG. 23 is a diagram for describing an implementation method for the calibration of an antenna array according to an embodiment of the present disclosure.

FIG. 22 illustrates the structure of a 90 GHz band down-conversion mixer based on the conventional technology. A down-conversion mixer requires multiple transistors, multiple inductors, and a capacitor structure. Accordingly, the down-conversion mixer has a varying matching characteristic because the elements are added, and thus a design level of difficulty and a fabrication costs are high.

Figure 23:
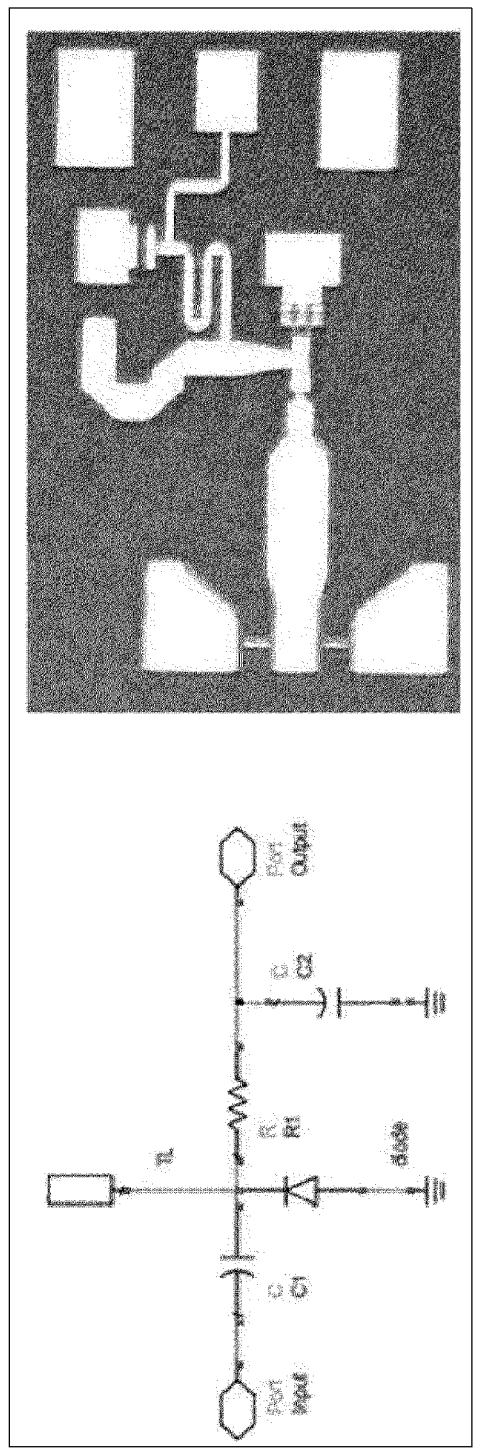
FIG. 23 is a diagram for describing an implementation method for the calibration of an antenna array according to an embodiment of the present disclosure.

FIG. 23 illustrates a 90 GHz power detector based on an embodiment of the present disclosure. In the present disclosure, for the calibration of an antenna, the power detector is used instead of the conventional down-conversion mixer.

Referring to FIGS. 22 and 23, the power detector has a simpler structure than the down-conversion mixer because it is configured with one Schottky diode, two capacitors, and one resistor. Accordingly, according to an embodiment of the present disclosure, complexity and a cost in terms of an implementation of the apparatus for performing the calibration of an antenna can be reduced.

Hereinafter, contents related to sequential calibration of an array antenna according to an embodiment of the present disclosure are described with reference to FIGS. 24 to 26.

Figure 24:
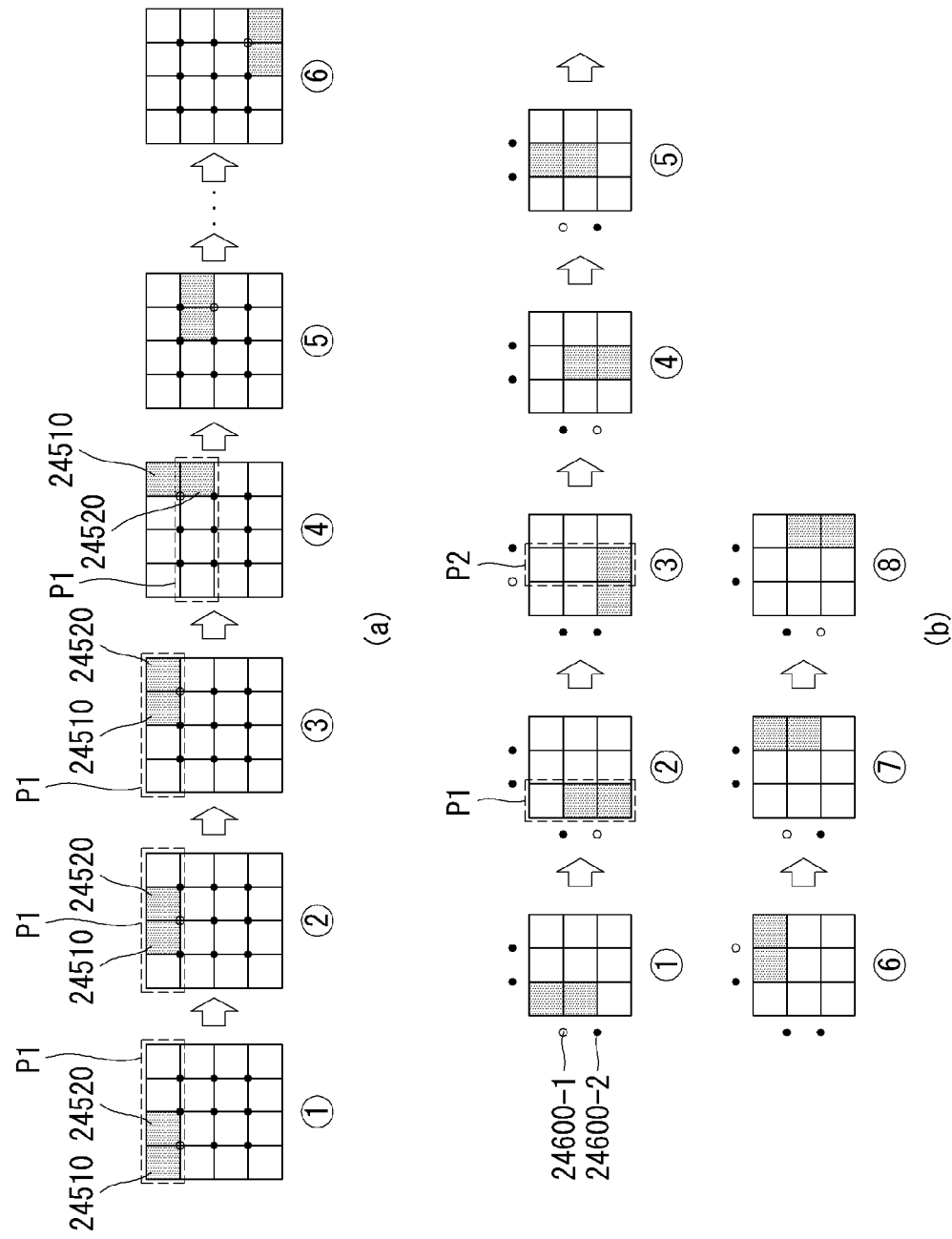
FIG. 24 is an example of a change of a first antenna and a second antenna in the calibration of an antenna array according to an embodiment of the present disclosure.

FIG. 24 is an example of a change of a first antenna and a second antenna in the calibration of an antenna array according to an embodiment of the present disclosure.

If the frequency rises, the size of an antenna array is increased. Accordingly, a system for beamforming calibration may be implemented in a shape, such as FIGS. 24(a) and 24(b).

Referring to FIG. 24(a), shaded boxes having a square form mean antennas 24510 and 24520 to which a signal has been applied. The remaining boxes mean antennas 24500 to which a signal has not been applied. The first antenna 24510 among the shaded antennas 24510 and 24520 means a reference antenna or a second antenna 24520 ion which calibration has already been performed. The second antenna 24520 means an antenna which is adjacent to the first antenna 24510 and on which calibration has not been performed (i.e., an antenna, that is, a target of calibration). A circular point positioned between the antennas 24500 indicates a coupling antenna.

Referring to FIG. 24(b), a not-shaded point indicates an operating coupling antenna 24600-1, and a shaded point indicates a coupling antenna 24600-2 that does not operate.

Sequential calibration of the antenna 24500 is described in detail with reference to FIG. 24(a). The calibration of the array antenna including the 16 antennas 24500 may be performed in such a manner that a group including the first antenna 24510 and the second antenna 24520 is sequentially changed. That is, as a determination of the first antenna 24510 and the second antenna 24520 among the 16 antennas 24500 and the calibration of the determined second antenna 24520 are repeatedly performed, the calibration of the array antenna may be completed.

An antenna on the top left side within the array antenna may be a reference antenna. The first antenna 24510 may be determined as a reference antenna. A second antenna 24520 neighboring the first antenna 24510 may be determined as a second antenna (①). The first antenna 24510 and the second antenna 24520 may be determined among antennas related to a first location P1 of the array antenna. In this case, only a coupling antenna 24600 positioned between the first antenna 24510 and the second antenna 24520 may be enabled (or on state), and the remaining coupling antenna 24600 may be in a disabled state (or off state).

In the ①,, the second antenna 24520 on which calibration has been performed may be determined as a first antenna 24510. An antenna 24520 which is adjacent to the first antenna 24510 and on which calibration has not been performed, among antennas related to the first location P1, may be determined as a second antenna 24520 (②).

In order to perform an efficient calibration, a minimum coupling antenna may be disposed. This is described below with reference to FIG. 24(b).

FIG. 24(b) illustrates a case where three antennas are disposed in each of the row and column direction of an array antenna, that is, a total of 9 antennas 24500 are disposed in the array antenna. Unlike in FIG. 24(a), a coupling antenna 24600 is positioned outside the array antenna, and a total number of coupling antennas are 4.

In FIG. 24(a), one coupling antenna 24600 is positioned every four antennas 24500. In contrast, in FIG. 24(b), the coupling antenna 24600 is positioned outside the array antenna. Accordingly, the calibration of the antenna array can be performed through a relatively small number of coupling antennas. Specifically, if n (i.e., the number of antenna arrays forming rows and columns, wherein n≥3) is an odd number, the calibration of all the antenna 24500 may be performed through the four coupling antennas 24600.

Referring to FIG. 24(b), a first antenna and a second antenna may be determined as follows based on the completion of the calibration of antennas related to the first location P1. Specifically, any one of antennas related to a first location P1 may be determined as the first antenna. The second antenna 24500 may be determined among antennas related to a second location P2.

According to an embodiment, the first location P1 may be based on a row or column of the array antenna, and the second location may be based on a row or column that neighbors the first location. In FIG. 24(b), the first location P1 corresponds to a column of the array antenna, and the second location P2 corresponds to a column neighboring the first location P1. Hereinafter, a determination of a first antenna and a second antenna in a 6*6 array antenna is described in detail with reference to FIG. 25.

Figure 25:
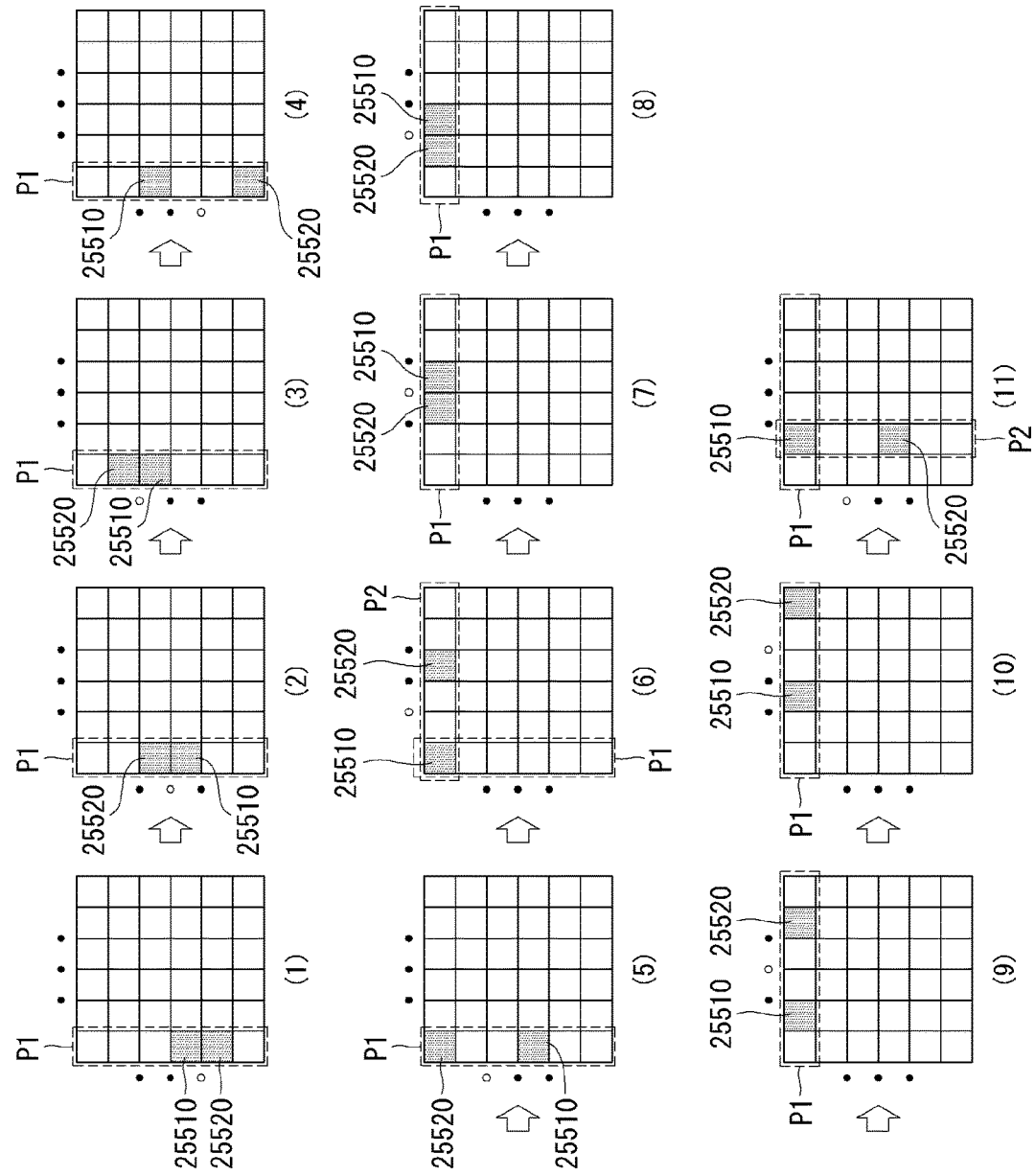
FIG. 25 is another example of a change of a first antenna and a second antenna in the calibration of an antenna array according to an embodiment of the present disclosure.

FIG. 25 is another example of a change of a first antenna and a second antenna in the calibration of an antenna array according to an embodiment of the present disclosure.

Referring to FIG. 25, the array antenna includes a total of 36 antennas 25500. A total number of coupling antenna is 6. Three of the 6 coupling antennas are disposed in each of a column on the left of the array antenna and a row at the top of the array antenna.

The array antenna including the 36 antennas 25500 as described above may be calibrated through the 6 coupling antennas. Hereinafter, a determination of a first antenna 25510 and a second antenna 25520 related to a first location P1 and a second location P2 is more specifically described.

(1) The first antenna 25510 is determined among 6 antennas (i.e., antennas included in the leftmost column of the array antenna) related to the first location P1. The first antenna 25510 may be a reference antenna. The reference antenna may mean an antenna, which may be a reference for calibrating other antennas because calibration has been performed, an error does not occur, or a corresponding error is very small. An antenna which is adjacent to the first antenna 25510 and on which calibration has not been performed, among the 6 antennas, may be determined as the second antenna 25520.

(2) The first antenna 25510 is determined as a reference antenna in the (1). An antenna which is adjacent to the first antenna 25510 and on which calibration has not been performed is determined as a second antenna 25520.

(3) The second antenna 25520 on which calibration has been performed in the (2) is determined as a first antenna 25510. An antenna which is adjacent to the first antenna 25510 and on which calibration has not been performed, among the 6 antennas, is determined as a second antenna 25520.

(4) A first antenna 25510 is determined as the same antenna as the first antenna 25510 in the (3). An antenna which is adjacent to the first antenna 25510 and on which calibration has not been performed is determined as a second antenna 25520. In this case, when the second antenna 25520 is described as neighboring the first antenna 25510, this may mean that the second antenna is included in the same row and column on the basis of a row or column of the array antenna.

(5) A first antenna 25510 is determined as the same antenna as the first antenna 25510 in the (1). An antenna which is adjacent to the first antenna 25510 and on which calibration has not been performed is determined as a second antenna 25520. The calibration of the antennas 25500 included in the first location P1 is completed through calibrations in the (1) to (5).

(6) Any one of antennas related to the first location P1 may be determined as a first antenna 25510 based on the completion of the calibration of the antennas 25500 included in the first location P1. A second antenna 25520 may be determined among antennas related to a second location P2. According to an embodiment, the second location P2 may be based on a row or column neighboring the first location P1. Specifically, the second location P2 may be based on a row or column parallel to or orthogonal to the first location P1. In FIG. 25, the second location P2 is the first row orthogonal to the first location P1.

(7) The second location P2 in the (6) becomes a first location P1. In subsequent (8)~(10), calibration is performed while the first antenna 25510 and the second antenna 25520 are sequentially changed for the calibration of the antennas 25500 included in the first location P1 using the same method as that of (1) to (5).

That is, the first location P1 means a row or column including antennas, that is, a target of calibration, in the array antenna. The second location P2 means a row or column including antennas, that is, a next target of calibration, when the calibration of the antennas included in the first location P1 is completed. Accordingly, the second location P2 may be denoted as a first location P1 after the switching of a target of calibration (i.e., a row or a column).

(11) A first antenna 25510 and a second antenna 25520 are determined like the (6) based on the completion of the calibration of the antennas included in the first location P1. Hereinafter, the deployment of a coupling antenna is described in detail with reference to FIG. 26.

Figure 26:
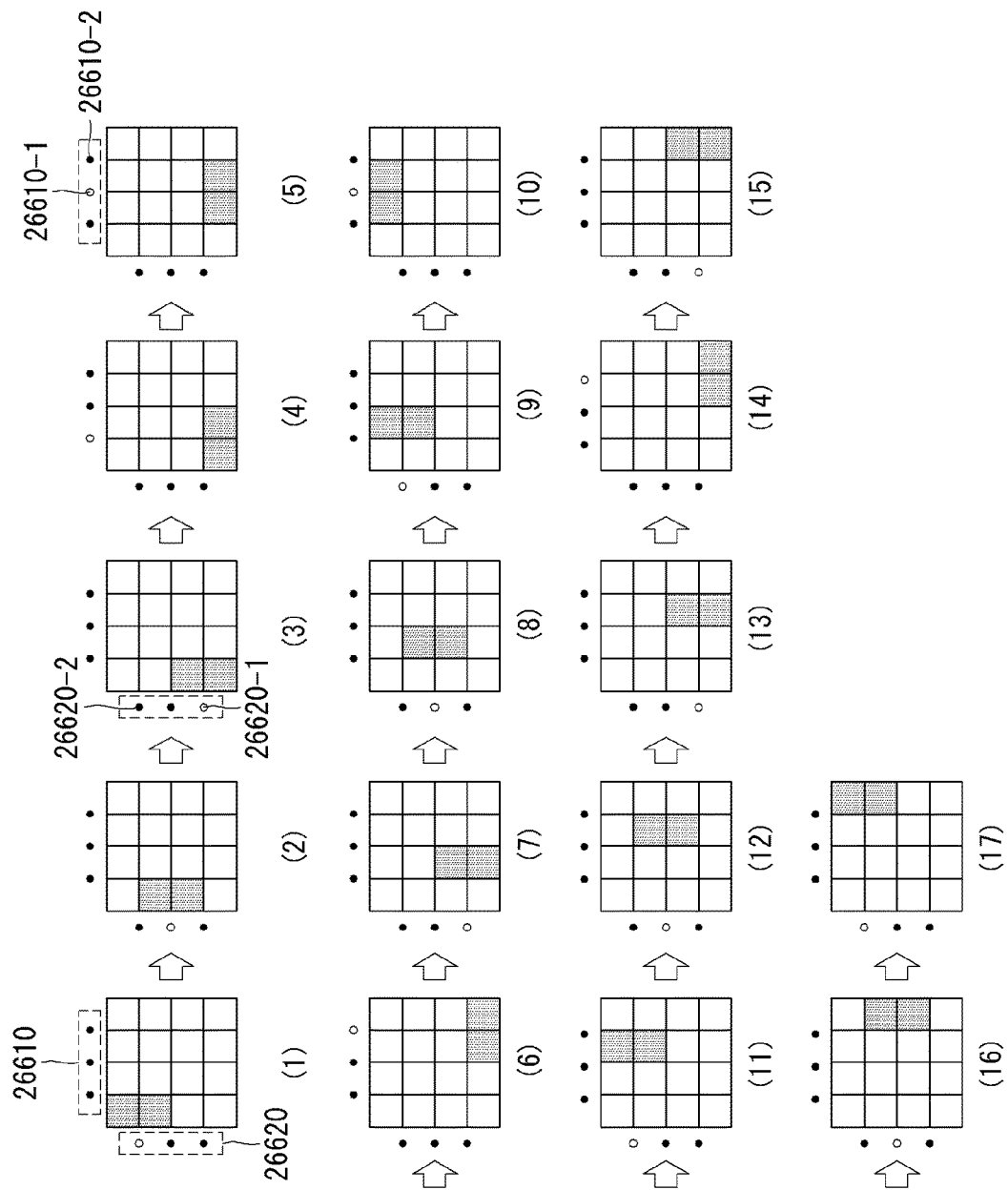
FIG. 26 is a diagram for describing the deployment and operation of coupling antennas in the calibration of an antenna array according to an embodiment of the present disclosure.

FIG. 26 is a diagram for describing the deployment and operation of coupling antennas in the calibration of an antenna array according to an embodiment of the present disclosure.

According to an embodiment, a plurality of coupling antennas for the calibration of an antenna array may be disposed in each of one row and one column parallel to a specific row or specific column of the array antenna. A specific coupling antenna enabled for the calibration may be any one of coupling antennas belonging to a row or column parallel to a first location P1.

Referring to FIG. 26, three coupling antennas 26610 are disposed in a row parallel to the first row of the array antenna at the top. Three coupling antennas 26620 are disposed in a column parallel to the first column on the left of the array antenna.

A determined of a first antenna and a second antenna in (1) to (17) is performed like FIGS. 24 and 25.

A specific coupling antenna enabled for the calibration of the second antenna may be determined based on a first location (i.e., a row or column of the array antenna) including a first antenna and a second antenna. Referring to FIG. 26(1), the specific coupling antenna may be determined among coupling antennas 26620 disposed in parallel to a column (corresponding to P1 in FIG. 25) including a first antenna and a second antenna.

The specific coupling antenna may be an antenna positioned between the first antenna and the second antenna based on specific coordinates (e.g., an x or y coordinates in x-y coordinates). For example, referring to FIG. 26(1), in the case of coupling antennas 26620 disposed in a column, the location of a specific coupling antenna may be as follows. A coordinate (y value) based on a location of the specific coupling antenna may be a middle value of a location (y1) of the first antenna and a location (y2) of the second antenna or may be a value included in the corresponding section (y1~y2). For another example, referring to FIG. 26(5), in the case of coupling antennas 26610 disposed in a row, a location of a specific coupling antenna may be as follows. A coordinate (x value) based on a location of the specific coupling antenna may be a middle value of a location (x1) of the first antenna and a location (x2) of the second antenna or may be a value included in the corresponding section (x1~x2).

As described above, in the embodiments of FIGS. 25 and 26, the calibration of the antenna array can be performed using a relatively small number of coupling antennas compared to the embodiment of FIG. 24(a). Accordingly, the complexity of the entire system can be reduced.

Hereinafter, the deployment of an array antenna having a sub-array structure and a coupling antenna is described with reference to FIG. 27.

Figure 27:
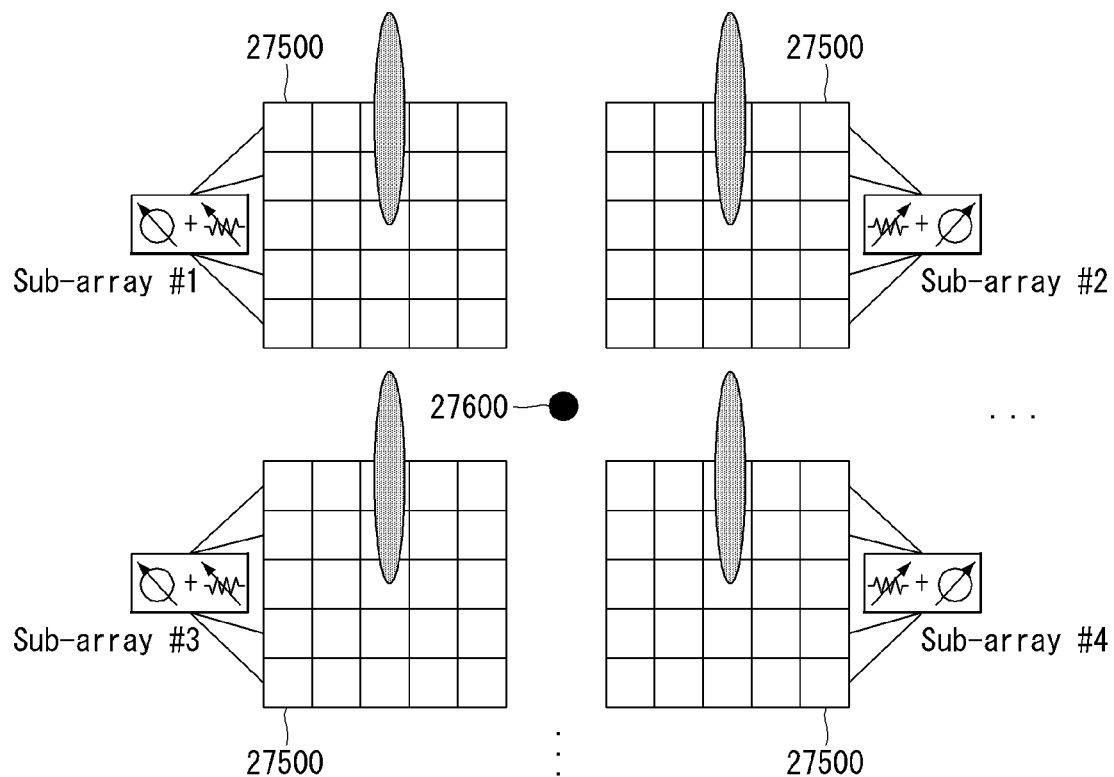
FIG. 27 is a diagram for describing the deployment of coupling antennas in the case of a subarray-based system according to an embodiment of the present disclosure.

FIG. 27 is a diagram for describing the deployment of coupling antennas in the case of a subarray-based system according to an embodiment of the present disclosure.

Referring to FIG. 27, the array antenna has a sub-array structure. That is, a plurality of antennas 27500 is coupled to one beamformer. A coupling antenna 27600 may be positioned between a plurality of antennas 27500 coupled to four beamformers, respectively.

Hereinafter, a method of calibrating an array antenna, which is performed by the apparatus for calibrating an array antenna based on at least one of the aforementioned embodiments, is described with reference to FIG. 28. The following embodiments have been divided for convenience of sake, and some elements of one embodiment may be substituted with some elements of another embodiment or they may be combined and applied.

Figure 28:
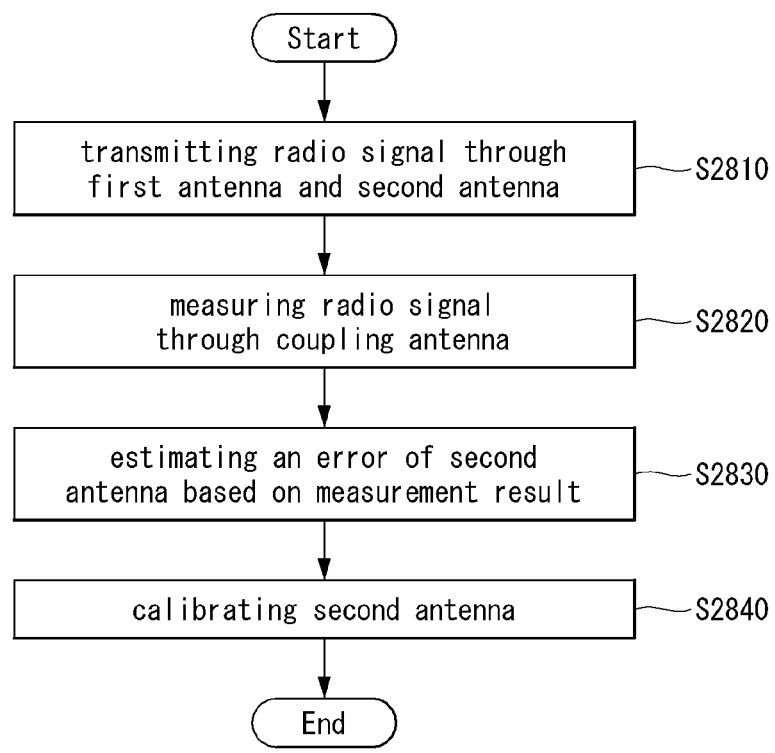
FIG. 28 is a flowchart for describing a method of calibrating an array antenna in a wireless communication system according to an embodiment of the present disclosure.

FIG. 28 is a flowchart for describing a method of calibrating an array antenna in a wireless communication system according to an embodiment of the present disclosure.

Referring to FIG. 28, the method of calibrating an array antenna, which is performed by the apparatus for calibrating an array antenna in a wireless communication system according to an embodiment of the present disclosure, includes step S2810 of transmitting a radio signal through a first antenna and a second antenna, step S2820 of measuring a radio signal through a coupling antenna, step S2830 of estimating an error of the second antenna based on the results of the measurement, and step S2840 of calibrating the second antenna.

At step S2810, the apparatus transmits a radio signal through a first antenna and a second antenna determined among a plurality of antennas included in the array antenna.

According to an embodiment, the first antenna may be a reference antenna or the second antenna on which the calibration has already been performed. The second antenna may be an antenna which is adjacent to the first antenna and on which the calibration has not been performed. The present embodiment may be based on at least one of the embodiments of FIGS. 17 and 24 to 26.

The first antenna and the second antenna may be determined among antennas related to a first location in the array antenna. The first location may be based on a row or column of the array antenna.

The first antenna and the second antenna may be determined as follows based on the completion of the calibration of the antennas related to the first location. The first antenna may be determined as any one of the antennas related to the first location. The second antenna may be determined among antennas related to a second location.

The second location may be based on a row or column neighboring the first location. Specifically, the second location may be based on a row or column parallel to or orthogonal to the first location.

The plurality of coupling antennas may be disposed in one row or one column parallel to a specific row or specific column of the array antenna, respectively. The specific coupling antenna may be one of coupling antennas belonging to a row or column parallel to the first location.

According to an embodiment, the radio signal may be transmitted based on a pre-configured adjustment value. The present embodiment may be based on the embodiment of FIG. 17.

The radio signal may be repeatedly transmitted by a specific number of times. For example, the radio signal may be repeatedly transmitted four times.

The pre-configured adjustment value may be changed whenever the radio signal is transmitted. The pre-configured adjustment value may be related to at least one of a phase of the radio signal or a gain of the radio signal.

The pre-configured adjustment value may include a first adjustment value related to the first antenna and a second adjustment value related to the second antenna. The first adjustment value may include at least one of $A_1$ or $\theta_1$ based on the aforementioned embodiments. The second adjustment value may include at least one of $A_2$ or $\theta_2$ based on the aforementioned embodiments.

Figure 29:
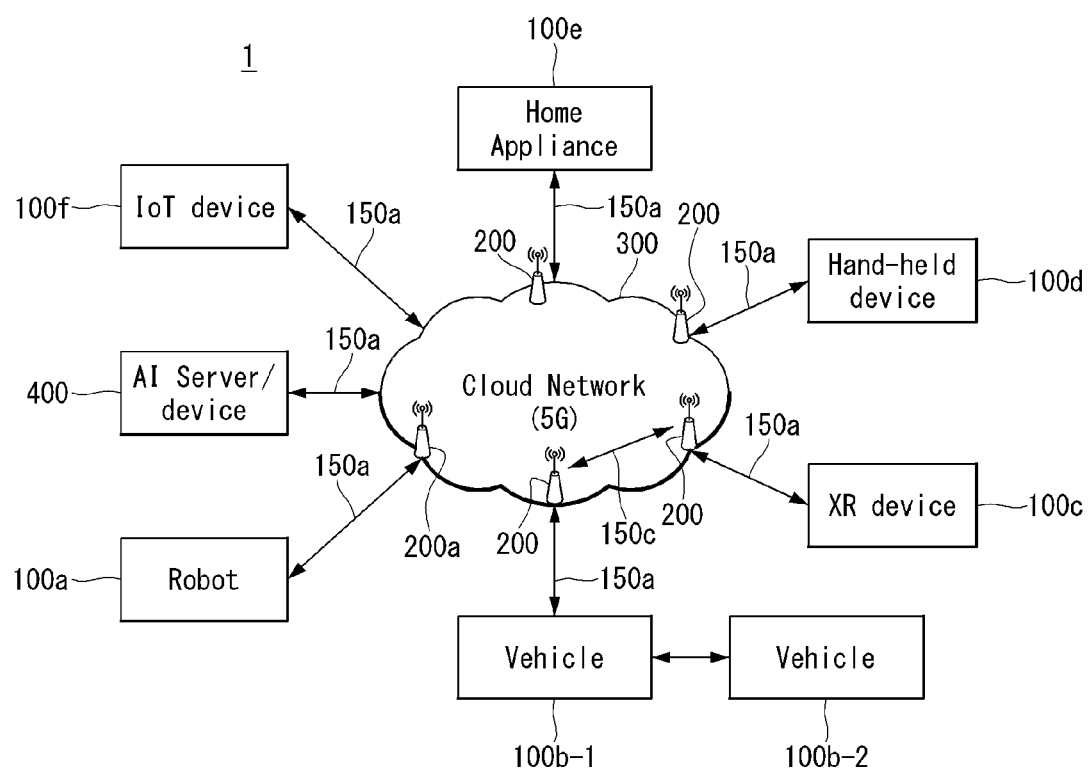
FIG. 29 illustrates a communication system 1 applied to the present disclosure.

According to step S2810, the operation of transmitting, by an apparatus (e.g., 100/200 in FIGS. 29 to 33), a radio signal to another apparatus (e.g., 100/200 in FIGS. 29 to 33) through a first antenna and a second antenna determined among a plurality of antennas included in an array antenna may be implemented by an apparatus of FIGS. 29 to 30. For example, referring to FIG. 30, one or more processors 102/202 may control one or more transceivers 106/206 and/or one or more memories 104/204 to transmit a radio signal to a wireless device 200/100 through a first antenna and a second antenna determined among a plurality of antennas included in the array antenna.

At step S2820, the apparatus measures the radio signal through a specific coupling antenna of a plurality of coupling antennas disposed adjacent to the plurality of antennas.

According to step S2820, the operation of measuring, by the apparatus (e.g., 100/200 in FIGS. 29 to 33), the radio signal through a specific coupling antenna of a plurality of coupling antennas disposed adjacent to the plurality of antennas may be implemented by the apparatus of FIGS. 29 to 30. For example, referring to FIG. 30, the one or more processors 102/202 may control the one or more transceivers 106/206 and/or the one or more memories 104/204 to measure the radio signal through a specific coupling antenna of a plurality of coupling antennas disposed adjacent to the plurality of antennas.

At step S2830, the apparatus estimates an error of the second antenna based on a result of the measurement of the radio signal. The estimation of the error may be performed based on the descriptions ① to ④ of FIG. 17.

According to an embodiment, the result of the measurement may be based on the output of the power detector coupled to a specific coupling antenna. Specifically, the result of the measurement may be based on Equation 1 and Equation 4.

According to step S2830, the operation of estimating, by the apparatus (e.g., 100/200 in FIGS. 29 to 33), an error of the second antenna based on the result of the measurement of the radio signal may be implemented by the apparatus of FIGS. 29 to 30. For example, referring to FIG. 30, the one or more processors 102/202 may control the one or more transceivers 106/206 and/or the one or more memories 104/204 to estimate an error of the second antenna based on the result of the measurement of the radio signal.

At step S2840, the apparatus calibrates the second antenna based on the error.

According to step S2840, the operation of calibrating, by the apparatus (e.g., 100/200 in FIGS. 29 to 33), the second antenna based on the error may be implemented by the apparatus of FIGS. 29 to 30. For example, referring to FIG. 30, the one or more processors 102/202 may control the one or more transceivers 106/206 and/or the one or more memories 104/204 to calibrate the second antenna based on the error.

According to an embodiment, step S2841 to step S2840 may be repeatedly performed until the calibration of the plurality of antennas is completed.

Hereinafter, effects according to an embodiment of the present disclosure are described in detail.

According to an embodiment of the present disclosure, when beamforming is performed in a high frequency band of THz or more, an error of a phase and gain occurred in all RF paths can be effectively calibrated compared to a conventional technology. Accordingly, more precise beamforming can be performed. Furthermore, a signal to noise ratio can be improved and communication quality can be enhanced because a side lobe is reduced and a beam steering angle is not twisted by the calibration.

A more sensitive error may be caused with respect to the same size error in terms of a circuit fabrication process as the frequency is increased. Such a phenomenon becomes more severe as the frequency is increased. In a high frequency band such as the THz band, the design complexity of an RF circuit and costs a upon fabrication are increased. The structure according to an embodiment of the present disclosure can reduce costs upon mass production of a calibration apparatus and reduce a level of difficulty in the design because the structure has small complexity compared to a conventional structure. Accordingly, according to an embodiment of the present disclosure, if a high frequency band is used, improved communication quality can be obtained with relatively small costs.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 6G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 29 illustrates a communication system 1 applied to the present disclosure.

Referring to FIG. 29, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Devices Applied to Present Disclosure

FIG. 30 illustrates wireless devices applicable to the present disclosure.

Referring to FIG. 30, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 29.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s)

204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 31:
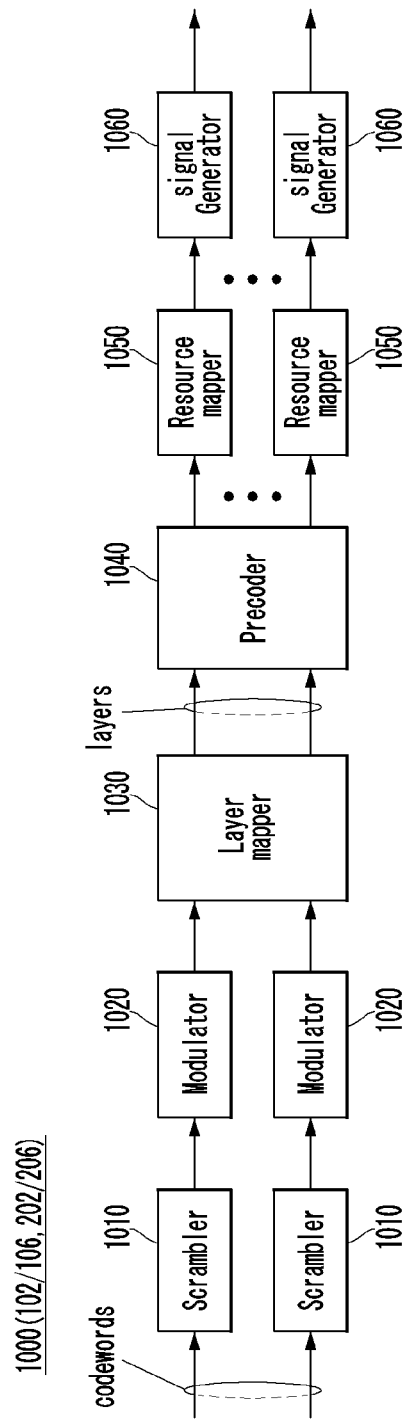
FIG. 31 illustrates a signal process circuit for a transmission signal applied to the present disclosure.

Example of a Signal Process Circuit for a Transmission Signal Applied to Present Disclosure FIG. 31 illustrates a signal process circuit for a transmission signal applied to the present disclosure.

Referring to FIG. 31, a signal processing circuit 1000 may include scramblers 1010, modulators 1020, a layer mapper 1030, a precoder 1040, resource mappers 1050, and signal generators 1060. An operation/function of FIG. 31 may be performed, without being limited to, the processors 102 and 202 and/or the transceivers 106 and 206 of FIG. 30. Hardware elements of FIG. 31 may be implemented by the processors 102 and 202 and/or the transceivers 106 and 206 of FIG. 30. For example, blocks 1010 to 1060 may be implemented by the processors 102 and 202 of FIG. 30. Alternatively, the blocks 1010 to 1050 may be implemented by the processors 102 and 202 of FIG. 30 and the block 1060 may be implemented by the transceivers 106 and 206 of FIG. 30.

Codewords may be converted into radio signals via the signal processing circuit 1000 of FIG. 31. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 31. For example, the wireless devices (e.g., 100 and 200 of FIG. 30) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of a Wireless Device Applied to Present Disclosure

Figure 32:
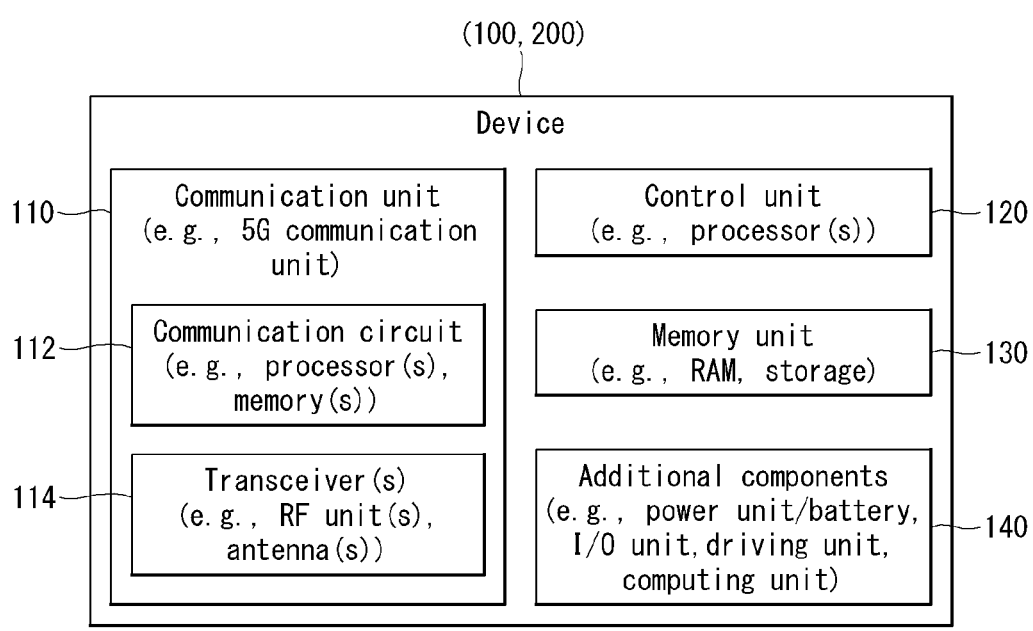
FIG. 32 illustrates another example of a wireless device applied to the present disclosure.

FIG. 32 illustrates another example of a wireless device applied to the present disclosure. The wireless device may be implemented in various forms according to a use-case/service (refer to FIG. 29).

Referring to FIG. 32, wireless devices 100 and 200 may correspond to the wireless devices 100 and 200 of FIG. 30 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 30. For example, the transceiver(s) 114 may include the one or more transceivers 106 and 206 and/or the one or more antennas 108 and 208 of FIG. 30. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 29), the vehicles (100*b*-1 and 100*b*-2 of FIG. 29), the XR device (100*c* of FIG. 29), the hand-held device (100*d* of FIG. 29), the home appliance (100*e* of FIG. 29), the IoT device (100*f* of FIG. 29), a digital broadcast terminal, a hologram device, a public safety device, an MTC device, a medicine device, a fintech device (or a finance device), a security device, a climate/environment device, the AI server/device (400 of FIG. 29), the BSs (200 of FIG. 29), a network node, etc. The wireless device may be used in a mobile or fixed place according to a use-example/service.

In FIG. 32, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of a Hand-Held Device Applied to Present Disclosure

Figure 33:
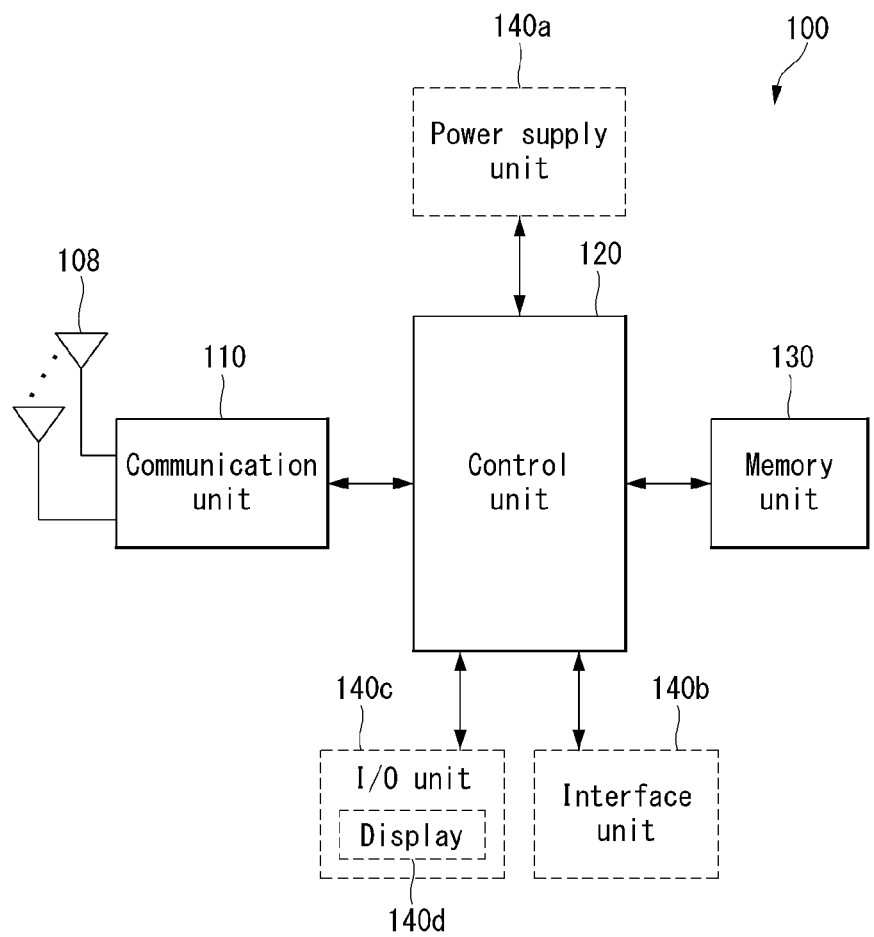
FIG. 33 illustrates a hand-held device applied to the present disclosure.

FIG. 33 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 33, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 32, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals, and may transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Effects of the method and apparatus for calibrating an antenna array in a wireless communication system according to an embodiment of the present disclosure are described as follows.

According to an embodiment of the present disclosure, the radio signal of an array antenna is measured through a coupling antenna. The calibration of an antenna is performed based on the results of the measurement. The results of the measurement are based on the output of a power detector coupled to the coupling antenna. Accordingly, the complexity of an antenna calibration apparatus can be reduced and the antenna calibration apparatus can be more economically implemented because a down-conversion mixer is not used in performing the calibration of the antenna.

According to an embodiment of the present disclosure, the calibration of a second antenna is performed based on a radio signal transmitted through a first antenna and the second antenna determined among a plurality of antennas included in an array antenna. The first antenna and the second antenna are determined within the array antenna based on a specific rule. Accordingly, if the volume of an array antenna is large, that is, if the number of antennas included in an array antenna is many, the calibration of all the antennas can be effectively performed.

According to an embodiment of the present disclosure, the calibration of an antenna array is performed based on a plurality of coupling antennas. The plurality of coupling antennas is disposed in one row or one column parallel to a specific row or specific column of the array antenna, respectively. The calibration of a second antenna is performed based on a specific coupling antenna of a plurality of coupling antennas. Accordingly, the calibration of the antenna array can be performed using a smaller number of coupling antennas although the volume of the array antenna is large because the coupling antennas are effectively disposed.

Effects which may be obtained from the present disclosure are not limited by the above effects, and other effects that have not been mentioned may be clearly understood from the above description by those skilled in the art to which the present disclosure pertains.

In the aforementioned embodiments, the elements and characteristics of the present disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements or the characteristics may be combined to form an embodiment of the present disclosure. The sequence of the operations described in the embodiments of the present disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the present disclosure may be implemented by various means, for example, hardware, firmware, software or a combination of them. In the case of an implementation by hardware, the embodiment of the present disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the present disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the present disclosure may be materialized in other specific forms without departing from the essential characteristics of the present disclosure. Accordingly, the detailed description should not be construed as being limitative from all aspects, but should be construed as being illustrative. The scope of the present disclosure should be determined by reasonable analysis of the attached claims, and all changes within the equivalent range of the present disclosure are included in the scope of the present disclosure.

What is claimed is:

1. A method of calibrating an array antenna, the method performed by an apparatus for calibrating an array antenna in a wireless communication system comprising:
   a first step of transmitting a radio signal through a first antenna and a second antenna determined among a plurality of antennas included in the array antenna;
   a second step of measuring the radio signal through a specific coupling antenna of a plurality of coupling antennas adjacent to the plurality of antennas;
   a third step of estimating an error of the second antenna based on a result of the measurement of the radio signal; and
   a fourth step of calibrating the second antenna based on the error,
   wherein the first step to the fourth step are repeatedly performed until a calibration of the plurality of antennas is completed,
   wherein the first antenna is a reference antenna or the second antenna on which the calibration has already been performed, and
   wherein the second antenna is an antenna which is adjacent to the first antenna and on which the calibration has not been performed.

2. The method of claim 1,
   wherein the radio signal is transmitted based on a pre-configured adjustment value, and
   wherein the result of the measurement is based on an output of a power detector coupled to the specific coupling antenna.

3. The method of claim 2,
   wherein the radio signal is repeatedly transmitted by a specific number of times.

4. The method of claim 3,
   wherein the pre-configured adjustment value is changed whenever the radio signal is transmitted.

5. The method of claim 4,
   wherein the pre-configured adjustment value is related to at least one of a phase of the radio signal or a gain of the radio signal.

6. The method of claim 5,
   wherein the pre-configured adjustment value includes a first adjustment value related to the first antenna and a second adjustment value related to the second antenna.

7. The method of claim 1,
   wherein the first antenna and the second antenna are determined among antennas related to a first location in the array antenna, and
   wherein the first location is based on a row or column of the array antenna.

8. The method of claim 7,
   wherein based on a completion of the calibration of the antennas related to the first location, the first antenna is determined as any one of the antennas related to the first location, and the second antenna is determined among antennas related to a second location.

9. The method of claim 8,
   wherein the second location is based on a row or column adjacent to the first location.

10. The method of claim 7,
    wherein the plurality of coupling antennas is disposed in one row or one column parallel to a specific row or specific column of the array antenna, respectively, and
    wherein the specific coupling antenna is one of coupling antennas belonging to a row or column parallel to the first location.

11. An apparatus for calibrating an array antenna in a wireless communication system, the apparatus comprising:
    an array antenna;
    one or more transceivers configured to transmit or receive a radio signal through the array antenna;
    a plurality of coupling antennas configured to measure the radio signal;
    a plurality of power detectors coupled to the plurality of coupling antennas;
    one or more processors configured to control the apparatus; and
    one or more memories operatively coupled to the one or more processors and configured to store instructions for performing operations when a calibration of the array antenna is executed by the one or more processors,
    wherein the operations include:
    a first step of transmitting a radio signal through a first antenna and a second antenna determined among a plurality of antennas included in the array antenna;
    a second step of measuring the radio signal through a specific coupling antenna of a plurality of coupling antennas adjacent to the plurality of antennas;
    a third step of estimating an error of the second antenna based on a result of the measurement of the radio signal; and
    a fourth step of calibrating the second antenna based on the error,
    wherein the first step to the fourth step are repeatedly performed until a calibration of the plurality of antennas is completed,
    wherein the first antenna is a reference antenna or the second antenna on which the calibration has already been performed, and
    wherein the second antenna is an antenna which is adjacent to the first antenna and on which the calibration has not been performed.

12. The apparatus of claim 11,
    wherein the radio signal is transmitted based on a pre-configured adjustment value, and
    wherein the result of the measurement is based on an output of a power detector coupled to the specific coupling antenna, among the plurality of power detectors.

13. The apparatus of claim 12,
    wherein the radio signal is repeatedly transmitted by a specific number of times.

14. The apparatus of claim 13,
    wherein the pre-configured adjustment value is changed whenever the radio signal is transmitted.

15. The apparatus of claim 14,
    wherein the pre-configured adjustment value is related to at least one of a phase of the radio signal or a gain of the radio signal.

16. The apparatus of claim 15,
    wherein the pre-configured adjustment value includes a first adjustment value related to the first antenna and a second adjustment value related to the second antenna.

17. The apparatus of claim 11,
wherein the first antenna and the second antenna are determined among antennas related to a first location in the array antenna, and
wherein the first location is based on a row or column of the array antenna.

18. The apparatus of claim 17,
wherein based on a completion of the calibration of the antennas related to the first location, the first antenna is determined as any one of the antennas related to the first location, and the second antenna is determined among antennas related to a second location.

19. The apparatus of claim 17,
wherein the plurality of coupling antennas is disposed in one row or one column parallel to a specific row or specific column of the array antenna, respectively, and
wherein the specific coupling antenna is one of coupling antennas belonging to a row or column parallel to the first location.

20. One or more non-transitory computer-readable media storing one or more commands, wherein one or more commands executable by one or more processors are configured to enable an apparatus to perform:

a first step of transmitting a radio signal through a first antenna and a second antenna determined among a plurality of antennas included in the array antenna;

a second step of measuring the radio signal through a specific coupling antenna of a plurality of coupling antennas adjacent to the plurality of antennas;

a third step of estimating an error of the second antenna based on a result of the measurement of the radio signal; and a fourth step of calibrating the second antenna based on the error, wherein the first step to the fourth step are repeatedly performed until a calibration of the plurality of antennas is completed, wherein the first antenna is a reference antenna or the second antenna on which the calibration has already been performed, and wherein the second antenna is an antenna which is adjacent to the first antenna and on which the calibration has not been performed.

\* \* \* \* \*